United States Patent [19]
Mann

[11] Patent Number: 5,978,902
[45] Date of Patent: Nov. 2, 1999

[54] DEBUG INTERFACE INCLUDING OPERATING SYSTEM ACCESS OF A SERIAL/PARALLEL DEBUG PORT

[75] Inventor: Daniel P. Mann, Austin, Tex.

[73] Assignee: Advanced Micro Devices, Inc., Sunnyvale, Calif.

[21] Appl. No.: 08/992,276

[22] Filed: Dec. 17, 1997

Related U.S. Application Data

[60] Provisional application No. 60/043,070, Apr. 8, 1997.

[51] Int. Cl.[6] .................................................. G06F 11/00
[52] U.S. Cl. ........................................... 712/227; 714/27
[58] Field of Search .............................. 712/227; 714/27, 714/30, 38, 28; 395/500.49

[56] References Cited

U.S. PATENT DOCUMENTS

| | | |
|---|---|---|
| 5,058,114 | 10/1991 | Kuboki et al. . |
| 5,321,828 | 6/1994 | Phillips et al. . |
| 5,357,626 | 10/1994 | Johnson et al. . |
| 5,371,689 | 12/1994 | Tatsuma . |
| 5,491,793 | 2/1996 | Somasundaram et al. . |
| 5,533,192 | 7/1996 | Hawley et al. ............................ 714/28 |
| 5,642,479 | 6/1997 | Flynn . |
| 5,752,013 | 5/1998 | Christensen et al. .................... 712/227 |
| 5,774,684 | 6/1998 | Haines et al. ............................ 710/129 |
| 5,774,708 | 6/1998 | Klingler . |
| 5,848,264 | 12/1998 | Baird et al. ......................... 395/500.49 |
| 5,867,644 | 2/1999 | Ranson et al. ........................... 709/224 |
| 5,889,988 | 3/1999 | Held ....................................... 709/103 |

FOREIGN PATENT DOCUMENTS

| | | |
|---|---|---|
| 316609 | 5/1989 | European Pat. Off. . |
| 0530816A3 | 3/1993 | European Pat. Off. . |
| 636976 | 2/1995 | European Pat. Off. . |
| 762276 | 3/1997 | European Pat. Off. . |
| 849670 | 6/1998 | European Pat. Off. . |
| 59-194245 | 11/1984 | Japan . |

OTHER PUBLICATIONS

Revill, Geoff, "Advanced On–chip Debug for ColdFire Developers", Embedded Systme Engineering, Apr./May 1997, pp. S2–S4.

Larus, James R., Efficient Program Tracing, 8153 Computer, No. 5, May 26, 1993, Los Alamitos, CA, pp. 52–61.

Advanced Micro Devices, "Am29040™Microprocessor User's Manual—29K Family", Advanced Micro Devices, Inc. 1994, pp. 12–1 through 12–26.

(List continued on next page.)

*Primary Examiner*—William M. Treat
*Attorney, Agent, or Firm*—Zagorin, O'Brien & Graham, LLP

[57] ABSTRACT

A debug interface supports data transfer using read and write system calls that communicate data without stopping an executing kernel. The printf( ) command passes an information string to an executing operating system. The information string summons the operating system to use a serial debug port to signal to a debug device, such as a host system, that is connected to the serial port. The debug interface-supported read and write operations and system calls allow the kernel and executing applications software, respectively, to continue executing during the read and write data transfers. The debug interface includes support for a plurality of extended function sideband signals that extend the functionality of the read and write functionality to allow the processor to concurrently run kernel and application programs while transferring data using read and write operation. The extended function sideband signals include a command acknowledge signal (CMDACK), a dual-purpose break execution and trace control signal (BRTC), an execution stopped and receive data signal (STOPTX), and an off-chip trigger event signal (TRIG). The debug interface further includes a buffer for transferred data The kernel may run a first data transfer command which is not fully transmitted when a second data transfer command is issued. The operating system supports buffering of the data evoked by the second data transfer command using a conventional queuing operation.

16 Claims, 9 Drawing Sheets

OTHER PUBLICATIONS

O'Farrell, Ray, "Choosing a Cross–Debugging Methodology", Embedded Systems Programming, Aug. 1997, pp. 84–89.

Ganssle, Jack G., "Vanishing Visibility, Part 2", Embedded Systems Programming, Aug. 1997, pp. 113–115.

Ojennes, Dan, "Debugging With Real–Time Trace", Embedded Systems Programming, Aug. 1997, pp. 50–52, 54, 56, and 58.

IBM Techinical Disclosure Bulletin "Tailorable Embedded Event Trace", vol. 34, No. 7B, Dec. 1991, pp. 259–261.

Intel "Pentium™ Processor User's Manual vol. 3: Architecture and Programming Manual", 1994, pp. 17–1 through 17–9.

K5 HDT, e–mail describing K5 HDT, Jan. 11, 1997, pp. 1–6.

Motorola "CPU32 Reference Manual", pp. 7–1 thru 7–13 (admitted prior to Apr. 8, 1997).

Motorola "MEVB Quick Start Guide", pp. 3–5 thru 7–2 (admitted prior to Apr. 8, 1997).

Heinicke et al., "A Real Time Integrated Environment for Motorola 680xx–based VME and FASTBUS Modules", Oct. 1989.

IEEE Transactions on Nuclear Science, vol. 36, iss. 5, pp. 1701–1705.

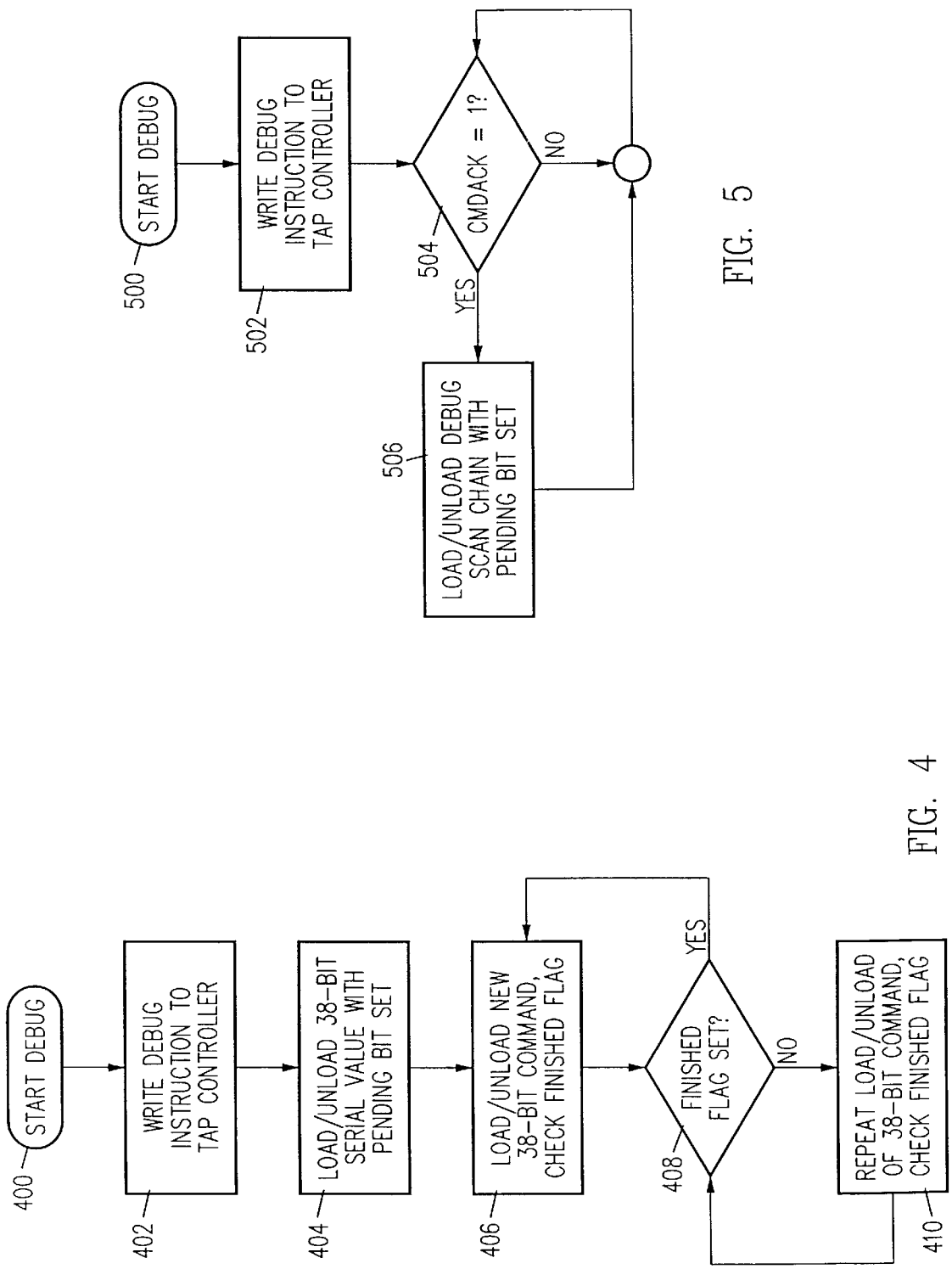

FIG. 6A

| 20 | | | | | 15 | | | | | | | | | | | | | | | 0 |
|---|---|---|---|---|---|---|---|---|---|---|---|---|---|---|---|---|---|---|---|---|
| 0 | 0 | 0 | 0 | 1 | B3 | B2 | B1 | 1 | 0 | 0 | 0 | 0 | 0 | 0 | 0 | 0 | 0 | 0 | 0 | 0 |

TCODE=1      Only 3-bits of BFIELD used

FIG. 6B

| 20 | 19  15 | 0 |
|---|---|---|
| 0 | TCODE=2 | TADDR_H, high 16-bits of EIP target logical address |
| 0 | TCODE=7 | TADDR_L, low 16-bits of EIP target logical address |

FIG. 6C

| 20 | 19  15 | 0 |
|---|---|---|
| 0 | TCODE=8 | TADDR_H, high 16-bits of EIP stop instruction logical address |
| 0 | TCODE=7 | TADDR_L, low 16-bits of EIP stop instruction logical address |
| 0 | TCODE=4 | BADDR_H, high 16-bits of Current segment base address |
| 0 | TCODE=7 | BADDR_L, low bits 15-4 of segment base address \| — \| PG \| SZ \| R̄/P |

FIG. 6D

| 20 | 19  15 | 0 |
|---|---|---|
| V̄ | TCODE=1 | 1     BFIELD |
| 0 | TCODE=6 | TADDR_H, high 16-bits of EIP for interrupted instruction logical address |
| 0 | TCODE=7 | TADDR_L, low 16-bits of EIP for interrupted instruction logical address |
| 0 | TCODE=3 | BADDR_H, high 16-bits of previous segment base address |
| 0 | TCODE=7 | BADDR_L, low bits 15-4 of segment base address \| — \| PG \| SZ \| R̄/P |
| 0 | TCODE=5 | Vector number |
| 0 | TCODE=7 | TADDR_H, high 16-bits of interrupt handler logical address |
| 0 | TCODE=7 | TADDR_L, low 16-bits of instruction logical address |

| 20 | 19 | 15 | | 0 |
|---|---|---|---|---|
| V̄ | TCODE=1 | 1 | BFIELD | |
| 0 | TCODE=3 | BADDR_H, high 16-bits of previous segment base address | | |
| 0 | TCODE=7 | BADDR_L, low bits 15-4 of segment base address | – PG SZ | R̄/P |
| 0 | TCODE=2 | TADDR_H, high 16-bits of long-jump target logical address | | |
| 0 | TCODE=7 | TADDR_L, low 16-bits of long-jump target logical address | | |

FIG. 6E

| 20 | 19 | 15 | 0 |
|---|---|---|---|
| 0 | TCODE=9 | 16-bit value supplied by instruction | |

FIG. 6F

| 20 | 19 | 15 | 0 |
|---|---|---|---|
| 0 | TCODE=6 | TADDR_H, high 16-bits of EIP to current instruction logical address | |
| 0 | TCODE=7 | TADDR_L, low 16-bits of EIP for current instruction logical address | |

FIG. 6G

DEBUG INTERFACE INCLUDING OPERATING SYSTEM ACCESS OF A SERIAL/PARALLEL DEBUG PORT

RELATED APPLICATIONS

This application claims priority to U.S. application Ser. No. 60/043,070, filed Apr. 8, 1997, which is hereby incorporated by reference.

BACKGROUND OF THE INVENTION

1. Field of the Invention

The present invention relates to computer systems such as microprocessors. More specifically, the present invention relates to a software debug support system and operating method in processors.

2. Description of the Related Art

The growth in software complexity, in combination with increasing processor clock speeds, has placed an increasing burden on application software developers. The cost of developing and debugging new software products is now a significant factor in processor selection. A failure to include adequate software debug functionality in a processor results in longer customer development times and reduces attractiveness of the processor for use within industry. Software debug support is particularly useful in the embedded products industry, where specialized on-chip circuitry is often combined with a processor core.

The software debug tool configuration of a processor addresses the needs of several parties in addition to the software engineer who develops program code for execution on the processor. A "trace" algorithm developer searches through captured software trace data that reflects instruction execution flow in a processor. An in-circuit emulator developer deals with problems of signal synchronization, clock frequency and trace bandwidth. A processor manufacturer seeks a software debug tool solution that avoids an increased processor cost or design and development complexity.

In the desktop systems, complex multitasking operating systems are currently available to support software debugging. However, the initial task of getting the operating systems running reliably often calls for special development equipment While not standard in the desktop environment, development equipment such as logic analyzers, read-only memory (ROM) emulators, and in-circuit emulators (ICE) are sometimes used in the embedded industry. In-circuit emulators have some advantages over other debug environments including complete control and visibility over memory and register contents, and supplying overlay and trace memory if system memory is insufficient.

Traditional in-circuit emulators are used by interfacing a custom emulator back-end with a processor socket to allow communication between emulation equipment and the target system. The custom design of emulator interfaces in increasingly unrealistic and expensive as product life cycles are reduced and nonstandard and exotic integrated circuit packages are predominant in present day processor design.

Few known processor manufacturing techniques are available that include a suitable full-function in-circuit emulation functionality. Most processors in personal computer (PC) systems implement emulation functionality using a multiplexed approach in which existing pins are multiplexed for alternative use in a software debug application. Multiplexing of pins is not desirable in embedded controllers, which inherently suffer from overload of pin functionality.

Some advanced processors multiplex debug pins in time, for example by using the address bus to report software trace information during a Branch Target Address (BTA) cycle. The BTA-cycle is stolen from regular bus operation cycles. However in debug environments with high branch activity and low cache hit rates, BTA-cycles are often fully occupied handling branches, resulting in a conflict over access to the address bus that necessitates processor "throttle back" to prevent a loss of instruction trace information. For example, software in the communications industry is branch-intensive and suffers poor cache utilization often resulting in 20% or more throttle back, an unacceptable amount for embedded products which are subject to real-time constraints.

In another approach, a second "trace" or "slave" processor is combined with a main processor, with the two processors operating in-step. Only the main processor fetches instructions. The second, slave processor monitors fetched instructions on the data bus and maintains an internal state in synchronization with the main processor. The address bus of the slave processor supplies trace information. After power-up, via a JTAG (Joint Test Action Group) input, the second processor is switched into a slave mode of operation. The slave processor, freed from instruction fetch duties, uses the slave processor address bus and other pins to supply trace information.

Another existing debug strategy utilizes implementation of debug support into every processor in a system, but only bonding-out signal pins in a limited number of packages. The bond-out versions of the processor are used during debug and replaced with the smaller package for final production. The bond-out approach suffers from the need to support additional bond pad sites in all fabricated devices, a burden in small packages and pad limited designs, particularly if a substantial number of extra pins are required by the debug support variant. Furthermore, the debug capability of specially-packaged processors is unavailable in typical processor-based production systems.

In yet another approach, specifically the Background Debug Mode (BDM) implemented by Motorola, Inc., limited on-chip debug circuitry is implemented for basic run control. The BDM approach utilizes a dedicated serial link having additional pins and allows a debugger to start and stop the target system and apply basic code breakpoints by inserting special instructions in system memory. Once halted, special commands are used to inspect memory variables and register contents. The BDM system includes trace support, but not conveniently using the serial link. Instead the BDM system supplies trace support through additional dedicated pins and expensive external trace capture hardware that transfer instruction trace data.

Accordingly, present day techniques for software debugging suffer from a variety of limitations including increased packaging and development costs, circuit complexity, processor throttling, and bandwidth matching difficulties. Furthermore, no adequate low-cost procedure for providing trace information is currently available. The limitations of the existing solutions are likely to be exacerbated in the future as internal processor clock frequencies continue to increase.

In a conventional system, a processor discontinues execution in the debug mode and sets a stop transmit signal. An external system detects assertion of a stop and interrogates a debug port to determine the reason for termination of execution. Reasons for termination include, for example, a breakpoint, an illegal memory access, and transport of a printf( ) data string. The conventional system accesses a printf( ) data string, transfers the data string via the JTAG port, sends the printf( ) data string to a source-debug console, and sends a signal to the source-console designating that the command is terminated, the processor has stopped executing and the reason that execution is stopped. The processor is then enabled to begin execution and the interrupted program continues execution. Termination of execution may be suitable for debugging in kernel mode, but is generally unacceptable in application mode for many applications.

The printf( ) data transfer is cumbersome because the printf( ) command heavily intrudes into the operation of the processor. In the conventional system, entry into debug mode demands that the processor stops executing, and the debug port generates a signal indicating that the processor has stopped and the reason the processor has stopped is to deliver a printf( ) string. Accordingly, in the conventional system each time a printf( ) command is executed in the kernel mode debug or an application mode by a target system processor, the processor has to stop all ruing applications and stop execution of the kernel.

A well-known and highly critical problem with in-circuit emulation (ICE) systems is that a debug operation using ICE demands that the process executing in the target processor undergoing the debug operation must stop execution to allow examination of operating conditions and signals. Therefore, the advantage of the ICE system in allowing full control and visibility of data such as program trace data is countered by the disadvantage of stopping execution of the processor. When the processor stops, all interrupt handling stops, a highly disadvantageous condition in real-time environments such as communication and network environments.

What is needed is an apparatus and operating technique that allows a debug system full visibility and access to data, including a program trace capability, while permitting the processor, kernel software and application software to continue running while the debug data is accessed.

SUMMARY OF THE INVENTION

In accordance with an aspect of the present invention, a debug interface supports data transfer using read and write system calls that communicate data without stopping an executing kernel. The printf( ) command passes an information string to an executing operating system. The information string summons the operating system to use a serial debug port to signal to a debug device, such as a host system, that is connected to the serial port. The debug interface-supported read and write operations and system calls allow the kernel and executing applications software, respectively, to continue executing during the read and write data transfers. The debug interface includes support for a plurality of extended function sideband signals that extend the functionality of the read and write functionality to allow the processor to concurrently run kernel and application programs while transferring data using read and write operation. The extended function sideband signals include a command acknowledge signal (CMDACK), a dual-purpose break execution and trace control signal (BRTC), an execution stopped and receive data signal (STOPTX), and an off-chip trigger event signal (TRIG). The debug interface further includes a buffer for transferred data. The kernel may run a first data transfer command which is not fully transmitted when a second data transfer command is issued. The operating system supports buffering of the data evoked by the second data transfer command using a conventional queuing operation.

In accordance with an embodiment of the present invention, a processor includes a processor core supporting running of a software system and a debug interface connected to the processor core and connectable to an external software debug device. The software system includes input/output function calls. The external software debug device detects operating signals generated by the processor core during running of the software system. The software system transfers debug information via the debug interface using the input/output function calls while the processor core continues execution during a data transfer of the input/output function calls.

BRIEF DESCRIPTION OF THE DRAWINGS

The present invention may be better understood, and its numerous objects, features, and advantages made apparent to those skilled in the art by referencing the accompanying drawings.

FIG. 4 is a flowchart illustrating software debug command passing according to one embodiment of the invention;

FIG. 5 is a flowchart illustrating enhanced software port command passing according to a second embodiment of the invention; and FIGS. 6A–6G illustrate the general format of a variety of trace buffer entries for reporting instruction execution according to the invention.

The use of the same reference symbols in different drawings indicates similar or identical items.

DESCRIPTION OF THE PREFERRED EMBODIMENT(S)

Figure 1:
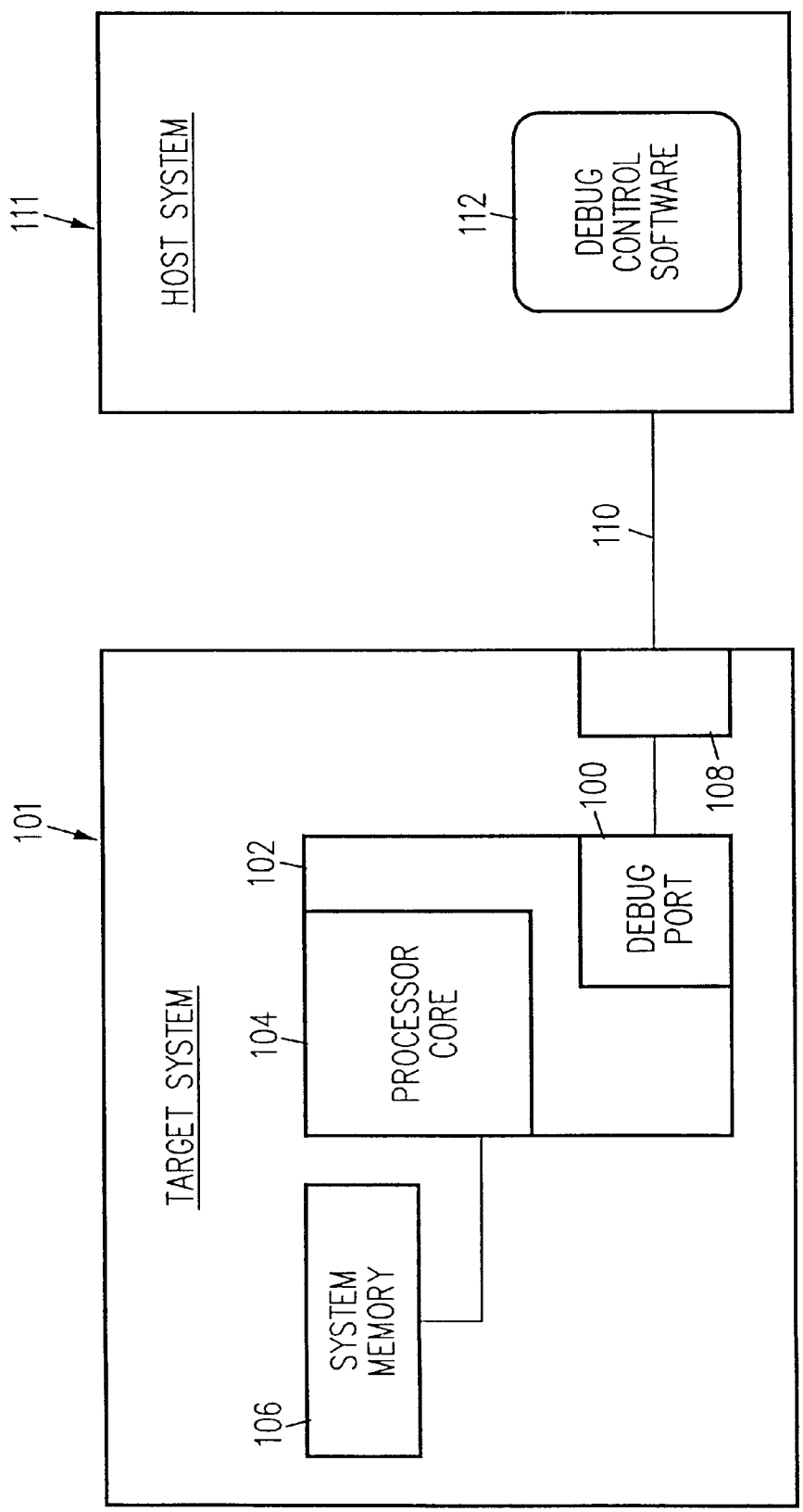
FIG. 1 is a schematic block diagram showing a software debug environment utilizing a software debug port according to an embodiment of the present invention.

Referring to FIG. 1, a schematic block diagram illustrates a software debug environment utilizing a debug port 100. A target system 101 is shown containing an embedded processor device 102 coupled to system memory 106. The embedded processor device 102 is an integrated debug interface for flexible, high-performance in an embedded hardware/software debug system. The embedded processor device 102 includes a processor core 104 and the debug port 100. In some embodiments, the embedded processor device 102 may incorporate additional circuitry (not shown) for performing application specific functions, or may take the form of a stand-alone processor or digital signal processor. In the illustrative embodiment, the debug port 100 includes an IEEE-1149.1-1990 compliant JTAG interface or other similar standardized serial port interface.

A host system 111 is used to execute debug control software 112 for transferring high-level commands and controlling the extraction and analysis of debug information generated by the target system 101. The host system 111 and target system 101 of the disclosed embodiment of the invention communicate via a serial link 110. Most computers are equipped with a serial or parallel interface which can be inexpensively connected to the debug port 100 by means of a serial connector 108, allowing most computers to function as a host system 111. In some embodiments, the serial connector 108 is replaced with higher speed JTAG-to-network conversion equipment.

Figure 2:
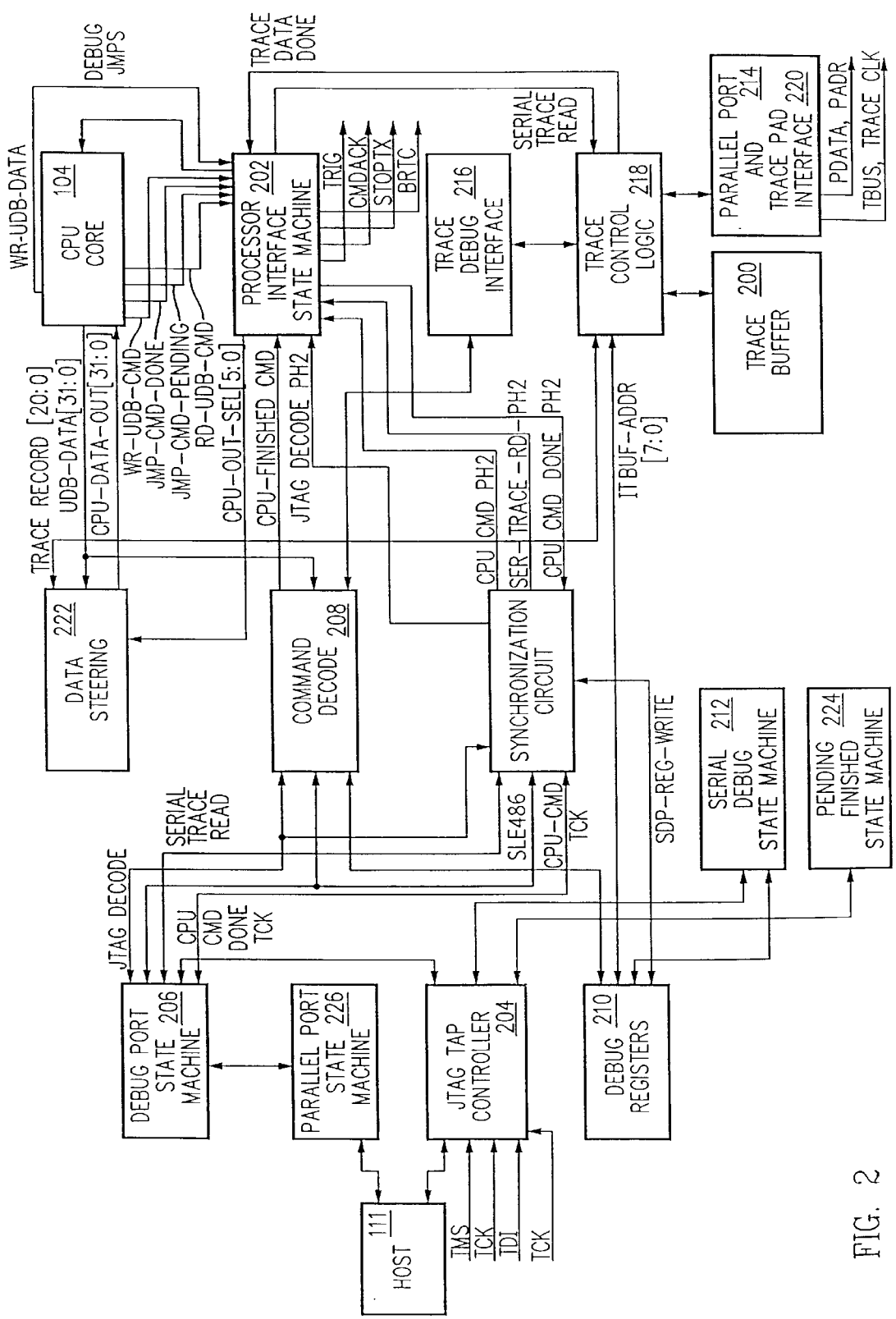
FIG. 2 is a schematic block diagram illustrating details of an exemplary embedded processor product incorporating a software debug port according to the present invention.

Referring to FIG. 2, a schematic block diagram illustrates the embedded processor device 102 in more detail, including the processor core 104 and various elements of the debug port 100 in an enhanced form. The embedded processor device 102 includes a plurality of state machines that communicate messages and data between a serial port of a JTAG TAP controller 204, a trace control circuit 218, and the processor core 104. In some embodiments, the embedded processor device 102 includes a parallel port 214 and the state machines similarly establish communication between the parallel port 214, the trace control circuit 218, and the processor core 104.

The state machines include a debug port state machine 206, a parallel port state machine 226, a processor interface state machine 202, and a pending/finished state machine 224. The state machines read the commands and data from the serial/parallel ports and direct decoding of the commands by a command decode and processing block 208 logic. Some commands, such as a command for reading data from memory, utilize processor core 104 intervention and are appropriately sent to the processor core 104. The state machines do not accept further commands until execution of a previous command is complete. Once the command is completed, a flag in a Debug Registers 210 block is asserted or an output pin is asserted to indicate command completion to the host system 111.

A minimal embodiment of the debug port 100 supports only conventional JTAG pins in a fast JTAG compliant interface that advantageously attains controllability and observability. The JTAG pins are a transportation mechanism that use existing pins to enter commands for performance by the processor core 104. Conventional JTAG pins carry conventional JTAG support signals that are well known in the art including a test clock signal TCK, a test mode select signal TMS, a test data input signal TDI, and a test data output signal TDO. The conventional JTAG pins are driven by a JTAG Test Access Port (TAP) controller 204.

The JTAG interface is enhanced to improve software debug capabilities and to transfer high-level commands into the processor core 104, rather than to scan processor pins. The JTAG-compliant serial interface is augmented for higher-speed access via supplemental sideband signals and a bond-out parallel interface with a 16-bit data path. Specifically, four pins are added to an embedded processor device 102 that supports JTAG functionality in a non-bondout package to fully support the enhanced 10-pin debug port 100 format. The enhanced embodiment of the debug port 100 supports the four additional pins carrying "sideband" signals including a command acknowledge signal CMDACK, a break request/trace capture signal BRTC, a stop transmit signal STOPTX, and a trigger signal TRIG to the standard JTAG interface. The additional sideband signals advantageously enhance performance and functionality of the debug port 100 by attaining highly precise external breakpoint assertion and monitoring, by triggering external devices in response to internal breakpoints, and by eliminating status polling of the JTAG serial interface. The sideband signals offer extra functionality and improve communications speeds for the debug port 100, but are optional and not utilized in the simplest embodiments of debug port 100 which uses conventional JTAG support signals. In the illustrative embodiment the sideband signals are used with an optional parallel port 214 provided on special bond-out versions of the embedded processor device 102.

Using conventional JTAG signals, the JTAG TAP controller 204 accepts standard JTAG serial data and control signals. When public JTAG DEBUG instruction is written to a JTAG instruction register, the serial debug shifter 212 is connected to a serial interface formed by the JTAG TAP controller 204. A JTAG test data input signal TDI and a test data output signal TDO are received by the serial debug shifter 212 via the JTAG TAP controller 204 so that commands and data are loaded into debug registers 210 and read from the debug registers 210. In the disclosed embodiment, the debug registers 210 include two debug registers for transmitting (TX_DATA register) and receiving (RX_DATA register) data, an instruction trace configuration register (ITCR), and a debug control status register (DCSR). Data are typically read from the JTAG TAP controller 204 using a Capture DR-Update DR sequence in the JTAG TAP controller state machine.

The Instruction Trace Configuration Register (ITCR) is written to control enabling, disabling, and configuration of Instruction Trace debug functions. The ITCR is accessed through the serial/parallel debug register write/read commands or by using a reserved instruction LDTRC.

The Debug Control/Status Register (DCSR) indicates when the processor core 104 enters debug mode and allows the processor core 104 to be forced into debug mode using the enhanced JTAG interface. DCSR also includes miscellaneous control feature enables bits. DCSR is accessible only through the serial/parallel debug register write/read commands.

A debug port state machine 206 coordinates loading and reading of data between the serial debug shifter 212 and the debug registers 210. The debug port state machine 206 interfaces to the JTAG TAP controller 204 via a parallel port state machine 226. A command decode and processing block 208, and the processor interface state machine 202, in combination, decode commands and data and dispatch the commands and data to a data steering circuit 222 which, in turn, communicates with the processor core 104 and trace control circuit 218. The processor interface state machine 202 communicates directly with the processor core 104 and a trace control circuit 218. A parallel port 214 communicates with the debug port state machine 206 and the data steering circuit 222 to perform parallel data read and write operations in optional bond-out versions of the embedded processor device 102.

The trace control circuit 218 generates trace record information for reconstructing instruction execution flow in the processor core 104. The trace control circuitry 218 interfaces to the processor core 104 and supports tracing either to a trace pad interface port 220, which is also called a DEBUG trace port 220, or to an internal trace buffer 200 and implements user control for selectively activating and deactivating trace functionality. The trace control circuitry 218 controls a trace pad interface port 220 which, in the illustrative embodiment, shares communication lines of the parallel port 214. When utilized, the trace pad interface port 220 supplies trace data while the processor 104 is executing instructions, although clock synchronization and other difficulties may arise. The trace control circuitry 218 enables other features including programmability of synchronization address generation and user specified trace records.

The processor core 104 supplies the tracing information that is used to generate trace records. The debug port interface 100 supplies the commands to enable and disable the trace function, and to turn trace capture on and off via the ITCR. Commands to read the trace buffer come from the processor core 104. At reset, tracing is disabled and trace capture is turned off. To begin generating trace records, tracing is enabled and trace capture turned on. When the processor core 104 enters the debug mode, trace capture is turned off. When the processor core 104 exits debug mode, trace capture status returns to the state prior to entering debug mode.

Tracing is enabled by setting the GTEN bit in the ITCR. Tracing is disabled by resetting the GTEN bit. When tracing is disabled, all trace records are discarded from the trace buffer 200. Trace capture is turned on by setting the TRON bit in the ITCR. Trace capture is turned off by resetting the TRON bit. The TRON bit is modified in one of several ways including directly writing to the TRON register, applying the break request/trace capture signal BRTC if the BTRC is enabled in the DCSR to control trace capture, and via DR0–DR3 register usage to turn trace capture on/off by enabling the option in the ITCR.

The disabling of trace gathering is advantageously a software option, reducing processor power consumption and eliminating natural throttle-back tendencies. Trace gathering is enabled both from the host system 111 and the target system 101. Trace information is not generated when the processor is operating in Debug mode. All other modes may be "traced" if the appropriate switches are set.

When tracing is disabled, contents of the trace buffer 200 are lost. However, when commands or trace/breakpoint control registers are used to temporarily stop/start trace accumulation, the trace buffer 200 is not flushed.

The trace control circuit 218 operates in one of two modes, external trace mode and internal trace mode, that differ in how the controller handles the trace records associated with trace events. The external trace mode is available on a bondout chip. In external trace mode, trace records are sent to the trace port 220. External trace mode is enabled by setting ITM=1 in the ITCR. The internal trace buffer temporarily stores trace records that cannot be sent to the trace port at the same rate as the records are generated by the processor core 104.

The internal trace mode is available on both a bondout and a non-bondout integrated circuit. In the internal trace mode, trace records are stored in the internal trace buffer 200. The internal trace mode is enabled by setting ITM=0 in the ITCR. The trace buffer 200 contents are accessed either through debug port commands or through the enhanced x86 instruction STBUF.

The trace buffer 200 improves bandwidth matching and reduces the need to incorporate throttle-back circuitry in the processor core 104. In one embodiment, the trace buffer 200 is a 256 entry first-in, first-out (FIFO) circular cache. Increasing the size of the trace buffer 200 increases the amount of software trace information that is captured.

When the processor core 104 takes a debug trap, the trace buffer might contain trace records. The processor core 104 will continue to send trace records to the trace port 220 until the buffer is empty. If the TBUS signals are shared with the parallel debug port 214, the trace port 220 does not switch to the parallel port 214 until the trace buffer 220 is empty. The trace buffer 220 is functionally used as a circular buffer for the internal trace mode of operation. Trace records overwrite existing data after 256 records are written into the trace buffer 200.

The JTAG TAP controller 204 functions as an IEEE-1149.1-1990-compliant serial command port that serves as a primary mode of communication between a host processor 111 and target processor to a maximum TCK rate of 25 MHz. Before debug information is communicated via the debug port 100 using only conventional JTAG signals, the port 100 is enabled by writing the public JTAG instruction DEBUG into a JTAG instruction register contained within the JTAG TAP controller 204. The JTAG instruction register is a 38-bit register including a 32-bit data field debug_data [31:0], a four-bit command field cmd[3:0] to point to various internal registers and functions provided by the debug port 100, a command pending flag (P), and a command finished flag (F). Some commands use bits of the debug_data field as a sub-field to extend the number of available commands. The pending and finished flags are controlled by a pending/finished state machine 224 that is connected to the JTAG TAP controller 204.

| JTAG Instruction Register | | | | |
|---|---|---|---|---|
| 37 | 5 4 | 2 | 1 | 0 |
| debug_data[31:0] | cmd[3:0] | | P | F |

This JTAG instruction register is selected by toggling the test mode select signal TMS. The test mode select signal TMS allows the JTAG clocking path to be changed in the scan path, enabling usage of multiple paths of varying lengths. Preferably, the JTAG instruction register is accessible via a short path. This register is configured to include a soft register for holding values to be loading or receiving from specified system registers.

Figure 3:
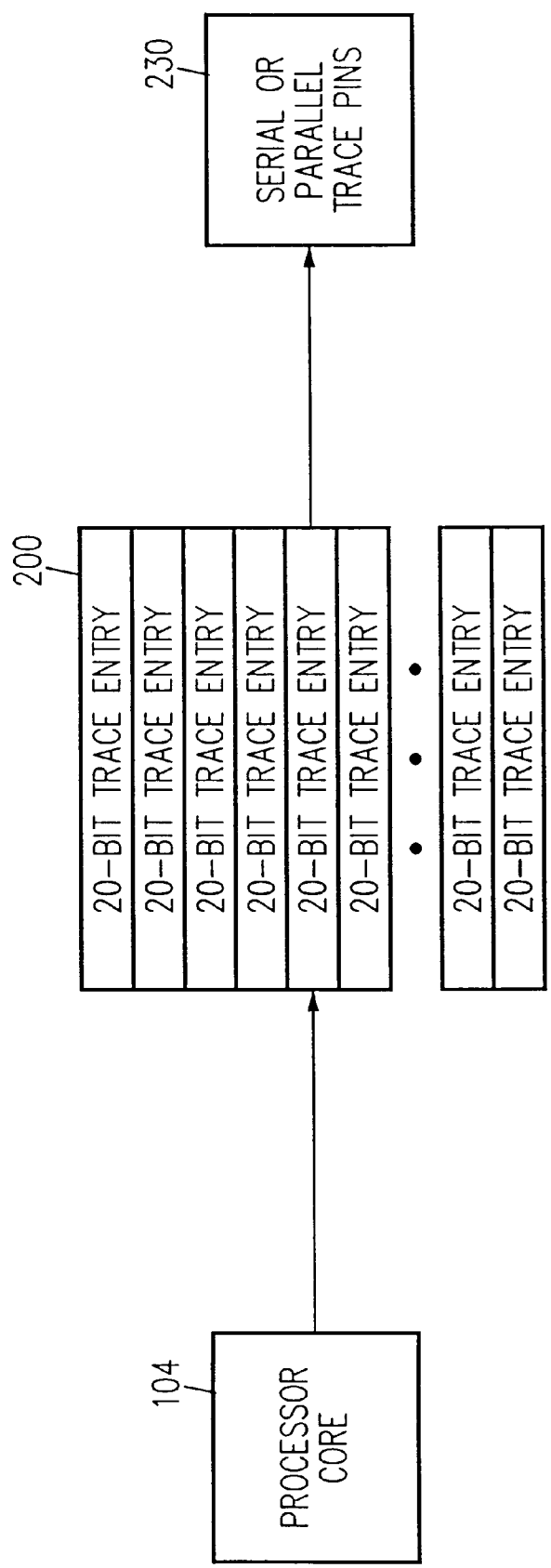
FIG. 3 is a simplified block diagram depicting the relationship between an exemplary instruction trace buffer and other components of an embedded processor product according to the present invention.

Referring now to FIG. 3, a simplified block diagram depicts the relationship between an exemplary instruction trace buffer 200 and other components of an embedded processor device 102. In one embodiment, the trace buffer 200 is a 256 entry first-in, first-out (FIFO) circular cache that records the most recent trace entries. Increasing the size of the trace buffer 200 increases the amount of instruction trace information that is captured, although the amount of required silicon area may increase.

The trace buffer 200 stores a plurality of 20-bit (or more) trace entries indicative of the order in which instructions are executed by the processor core 104. Other information, such as task identifiers and trace capture stop/start information, is also placed in the trace buffer 200. The contents of the trace buffer 200 are supplied to external hardware, such as the host system 111, via either serial or parallel trace pins 230. Alternatively, the target system 101 can be configured to examine the contents of the trace buffer 200 internally.

Referring to FIG. 4, a high-level flow chart illustrates a technique for passing a command when using a standard JTAG interface. Upon entering debug mode in step 400 the DEBUG instruction is written to the TAP controller 204 in step 402. In step 404, the 38-bit serial value is shifted in as a whole, with the command pending flag set and desired data (if applicable, otherwise zero) in the data field. Control proceeds to step 406 where the pending command is loaded/unloaded and the command finished flag checked. Completion of a command typically involves transferring a value between a data register and a processor register or memory/

IO location. After the command has been completed, the processor 104 clears the command pending flag and sets the command finished flag, at the same time storing a value in the data field if applicable. The entire 38-bit register is scanned to monitor the command finished and command pending flags. If the pending flag is reset to zero and the finished flag is set to one, the previous command has finished. The status of the flags is captured by the debug port state machine 206. A slave copy of the flag status is saved internally to determine if the next instruction should be loaded. The slave copy is maintained due to the possibility of a change in flag status between TAP controller 204 states, allowing the processor 104 to determine if the previous instruction has finished before loading the next instruction.

If the finished flag is not set as determined in step 408, control proceeds to step 410 and the loading/unloading of the 38-bit command is repeated. The command finished flag is also checked. Control then returns to step 408. If the finished flag is set as determined in step 408, control returns to step 406 for processing of the next command. DEBUG mode is exited via a typical JTAG process.

Returning to FIG. 2, the optional sideband signals are utilized in the enhanced debug port 100 to provide extra functionality. The optional sideband signals include a break request/trace capture signal BRTC that functions as a break request signal or a trace capture enable signal depending on the status of bit set in the debug control/status register. If set to function as a break request signal, the break request/trace capture signal BRTC is asserted to cause the processor 104 to enter debug mode. The processor 100 is also stopped by scanning in a halt command via the convention JTAG signals. If set to function as a trace capture enable signal, asserting the break request/trace capture signal BRTC enables trace capture. Deasserting the signal turns trace capture off. The signal takes effect on the next instruction boundary after the signal is detected and is synchronized with the internal processor clock. The break request/trace capture signal BRTC is selectively asserted at any time.

The trigger signal TRIG is configured to pulse whenever an internal processor breakpoint has been asserted. The trigger signal TRIG may be used to trigger an external capturing device such as a logic analyzer, and is synchronized with the trace record capture clock signal TRACECLK. When a breakpoint is generated, the event is synchronized with the trace capture clock signal TRACECLK, after which the trigger signal TRIG is held active for the duration of trace capture.

The stop transmit signal STOPTX is asserted when the processor 104 has entered DEBUG mode and is ready for register interrogation/modification, memory or I/O reads and writes through the debug port 100. In the disclosed embodiment of the invention, the stop transmit signal STOPTX reflects the state of a bit in the debug control status register (DCSR). The stop transmit signal STOPTX is synchronous with the trace capture clock signal TRACECLK.

The command acknowledge signal CMDACK is described in conjunction with FIG. 5, which shows a simplified command passing operation in the enhanced debug port 100 of FIG. 2. A DEBUG instruction is written to the TAP controller 204 in step 502 to place the target system 111 into DEBUG mode. Control proceeds to step 504 and the command acknowledge signal CMDACK is monitored by the host system 111 to determine command completion status. The CMDACK signal is asserted high by the target system 111 simultaneously with the command finished flag and remains high until the next shift cycle begins. The command finished flag status is accessible when using the command acknowledge signal CMDACK without shifting out the JTAG instruction register. The command acknowledge signal CMDACK transitions high on the next rising edge of the test clock signal TCK after the command finished flag has changed from zero to one. When using the enhanced JTAG signals, a new shift sequence in step 506 is not started by the host system 111 until the command acknowledge signal CMDACK pin is asserted high. The command acknowledge signal CMDACK is synchronous with the test clock signal TCK. The test clock signal TCK is not necessarily clocked at all times, but is ideally clocked continuously when waiting for a command acknowledge signal CMDACK response.

OPERATING SYSTEM/APPLICATION COMMUNICATION VIA THE DEBUG PORT

Also included in debug register block 210 is an instruction trace configuration register (ITCR), a 32-bit register for enabling/disabling and configuring instruction trace debug functions. Numerous functions are contemplated including various levels of tracing, trace synchronization force counts, trace initialization, instruction tracing modes, clock divider ratio information, as well as additional functions shown in the following table. The ITCR is accessed through a JTAG instruction register write/read command as is the case with the other registers of the debug register block 210, or via a reserved instruction.

| Instruction Trace Configuration Register (ITCR) | | |
|---|---|---|
| BIT | SYMBOL | DESCRIPTION/FUNCTION |
| 31:30 | Reserved | Reserved |
| 29 | RXINTEN | Enables interrupt when RX bit is set |
| 28 | TXINTEN | Enables interrupt when TX bit is set |
| 27 | TX | Indicates that the target system 111 is ready to transmit data to the host system 111 and the data is available in the TX_DATA register |
| 26 | RX | Indicates that data has been received from the host and placed in the RX_DATA register |
| 25 | DISL1TR | Disables level 1 tracing |
| 24 | DISL0TR | Disables level 0 tracing |
| 23 | DISCSB | Disables current segment base trace record |
| 22:16 | TSYNC[6:0] | Sets the maximum number of Branch Sequence trace records that may be output by the trace control block before a synchronizing address record is forced |
| 15 | TSR3 | Sets or clears trace mode on DR3 trap |
| 14 | TSR2 | Sets or clears trace mode on DR2 trap |
| 13 | TSR1 | Sets or clears trace mode on DR1 trap |
| 12 | TSR0 | Sets or clears trace mode on DR0 trap |
| 11 | TRACE3 | Enables Trace mode toggling using DR3 |
| 10 | TRACE2 | Enables Trace mode toggling using DR2 |
| 9 | TRACE1 | Enables Trace mode toggling using DR1 |
| 8 | TRACE0 | Enables Trace mode toggling using DR0 |
| 7 | TRON | Trace on/off |
| 6:4 | TCLK[2:0] | Encoded divider ratio between internal processor clock and TRACECLK |
| 3 | ITM | Sets internal or external (bond-out) instruction tracing mode |
| 2 | TINIT | Trace initialization |
| 1 | TRIGEN | Enables pulsing of external trigger signal TRIG following receipt of any legacy debug breakpoint; independent of the Debug Trap Enable function in the DCSR |
| 0 | GTEN | Global enable for instruction tracing through the internal trace buffer or via the external (bond-out) interface |

Another debug register is the debug control/status register (DCSR) that designates when the processor 104 has entered debug mode and allows the processor 104 to be forced into DEBUG mode through the enhanced JTAG interface. As shown in the following table, the DCSR also enables miscellaneous control features including forcing a ready signal to the processor 104, controlling memory access space for accesses initiated through the debug port, disabling cache flush on entry to the DEBUG mode, supplying transmit and received bits TX and RX, enabling the parallel port 214, forced breaks, forcing a global reset, and other functions. The ordering or inclusion of the various bits in either the ITCR or DCSR is a design choice that typically depends on the application and processor implementing the debug system.

| \multicolumn{3}{c}{Debug Control/Status Register (DCSR)} | | |
|---|---|---|
| BIT | SYMBOL | DESCRIPTION/FUNCTION |
| 31:12 | Reserved | Reserved |
| 11 | TX | Indicates that the target system 111 is ready to transmit data to the host system 111 and the data is available in the TX_DATA register |
| 10 | RX | Indicates that data has been received from the host and placed in the RX_DATA register |
| 9 | DISFLUSH | Disables cache flush on entry to DEBUG mode |
| 8 | SMMSP | Controls memory access space (normal memory space/system management mode memory) for accesses initiated through the Debug Port 100 |
| 7 | STOP | Indicates whether the processor 104 is in DEBUG mode (equivalent to stop transmit signal STOPTX |
| 6 | FRCRDY | Forces the ready signal RDY to the processor 104 to be pulsed for one processor clock; useful when it is apparent that the processor 104 is stalled waiting for a ready signal from a non-responding device |
| 5 | BRKMODE | Selects the function of the break request/trace capture signal BRTC (break request or trace capture on/off) |
| 4 | DBTEN | Enables entry to debug mode or toggle trace mode enable on a trap/fault via processor 104 registers DR0–DR7 or other legacy debug trap/fault mechanisms |
| 3 | PARENB | Enables parallel port 214 |
| 2 | DSPC | Disables stopping of internal processor clocks in the Halt and Stop Grant states |
| 1 | FBRK | Forces processor 104 into DEBUG mode at the next instruction boundary (equivalent to pulsing the external BRTC pin) |
| 0 | FRESET | Forces global reset |

When operating in a cross debug environment such as the environment shown in FIG. 1, a parent task running on the target system 111 sends information to the host platform 101 that controls the target system 101. The information may include, for example, a character stream from a printf( ) call or register information from a Task Control Block (TCB). In one technique for transferring the information, an operating system places the information in a known region then causes DEBUG mode to be entered via a trap instruction.

The printf( ) call is a well-known function or procedure call in programming languages such as tie C++ language and is typically supported in operating systems including various Windows™ operating systems such as Windows CE™. In the illustrative embodiment, an operating system performing in the processor core 104 of the target system 101 supports a printf( ) call that generates signals to the processor interface state machine 202 to support operating system access to information stored in the trace buffer 200.

The read-write services and function calls advantageously make debug information available to the operating system which may be exploited by the operating system to enable the operating system to perform debug functions. Accordingly, the operating system attains a debug functionality without adding the significant hardware of conventional debug tools.

These read-write services are supported by operating system or device driver software that can control the operations and communication of data by other debug ports. These services typically include read and write services and control selection services. Library layer operations such as printf( ) and scanf( ) system calls include formatting software and utilize low-level services. The printf( ) and scanf( ) system calls, when operating at the application privilege level make privilege system calls to access low-level services.

In a multitasking operating system, the illustrative embedded processor device 102 supports a debug functionality during the operating of a plurality of tasks permitting in-depth testing and analysis of the operations of the target system 101 in multiple various operating conditions and environments. Similarly, the embedded processor device 102 supports testing and analysis of the target system 101 while executing various types of programs that control multiple hardware subsystems.

Operating system support of debug functionality avoids the problems of conventional debug systems in integrating operating system software, in-circuit emulation hardware, and target system hardware.

The illustrative embedded processor device 102 supports input and output interactions via the scanf( ) and printf( ) function calls, respectively, that advantageously extend the debug functionality of the target system 101. For example, an I/O control function call and other low level services may be used to control debug hardware and software including the debug port such as the serial debug port (SDP) and the parallel port 214. Debug software may be generated that generates printf( ) statements in operating tasks including debug printf( ) statements, but also include nondebug printf( ) statements including operating system and application printf( ) statements. The combined debug, operating system, and application information may be formatted on a display screen in various configurations to produce highly informative displays. The embedded processor device 102 supports communication of character strings throughout the target system 101, for example through printf( ) support of the JTAG TAP controller 204, the parallel port 214, and the trace port 220. The embedded processor device 102 further supports communication of the data from the target system 101 to the host system 111 using kernel mode and application debug software support to display information on a source debugger console window. Debug information is transferred using the kernel printf( ) command with the processor core 104 continuing execution during the printf( ) data transfer.

In one embodiment of a target system 101 that includes debug functionality, software supports an application mode printf( ) command and a kernel mode printf( ) command. The embedded processor device 102 is specified to operate so that the processor core 104 continues to execute during execution of a printf( ) command and during transfer of a printf( ) data string. The debug port 100 responds to activating signals from the host system 111 by generating signals that cause the processor core 104 to perform a printf( ) command and quickly enter the kernel operating mode and assemble a character string that causes the processor core 104 to enter the debug mode.

The embedded processor device 102 supports data transfer using printf( ) and scanf( ) commands that communicate data without stopping an executing kernel. The printf( ) command passes an information string to an executing operating system. The information string summons the operating system to use a serial debug port 100 to signal to a debug device, such as the host system 111, that is connected to the serial port 100. The embedded processor device-supported printf( ) command allows the kernel and executing applications software to continue executing during the printf( ) data transfer. The embedded processor device 102 includes support for a plurality of extended function sideband signals that extend the functionality of the printf( ) command to allow the processor to concurrently run kernel and application programs while transferring data using a printf( ) command. The extended function sideband signals include a command acknowledge signal (CMDACK), a dual-purpose break execution and trace control signal (BRTC), an execution stopped and receive data signal (STOPTX), and an off-chip trigger event signal (TRIG).

The kernel may run a first printf( ) command which is not fully transmitted when a second printf( ) command is issued. The operating system supports buffering of the data evoked by the second printf( ) command using a conventional queuing operation.

The host system 111 uses debug port 100 commands to determine the reason for entering DEBUG mode and responds by retrieving the information from the reserved region. However, normal processor execution is stopped while the processor 104 is in DEBUG mode, an undesirable condition for real-time systems.

The undesirable condition is addressed in the illustrative system by supplying two debug registers in the debug port 100 including registers for transmitting data (TX_DATA register) and receiving (RX_DATA register) data. The TX_DATA and RX_DATA registers are accessed using the soft address and JTAG instruction register commands. The soft address is auto-incremented to assist data transfer. After the host system 111 writes a debug instruction to the JTAG instruction register, the serial debug shifter 212 is connected to the test data input signal TDI line and test data output signal TDO line.

The processor 104 executes code that transmits data by first testing a TX bit in the ITCR. If the TX bit is set to zero then the processor 104 executes either a memory or I/O write instruction to transfer the data to the TX_DATA register. The debug port 100 sets the TX bit in the DCSR and ITCR, indicating to the host system 111 a readiness to transmit data, and asserts the STOPTX pin high. After the host system 111 completes reading the transmit data from the TX_DATA register, the TX bit is set to zero. A TXINTEN bit in the ITCR is then set to generate a signal to interrupt the processor 104. The interrupt is generated only when the TX bit in the ITCR transitions to zero. When the TXINTEN bit is not set, the processor 104 polls the ITCR to determine the status of the TX bit to further transmit data.

The host system 111 transmits data by first testing a RX bit in the ITCR. If the RX bit is set to zero, the host system 111 writes the data to the RX_DATA register and the RX bit is set to one in both the DCSR and ITCR. A RXINT bit is then set in the ITCR to generate a signal to interrupt the processor 104. This interrupt is only generated when the RX in the ITCR transitions to one. When the RXINTEN bit is not set, the processor 104 polls the ITCR to verify the status of the RX bit. If the RX bit is set to one, the processor instruction is executed to read data from the RX_DATA register. After the data is read by the processor 104 from the RX_DATA register the RX bit is set to zero. The host system 111 continuously reads the ITCR to determine the status of the RX bit to further send data.

The information transfer technique using the RX_DATA and TX_DATA registers enables an operating system or application to communicate with the host system 111 without stopping processor 104 execution. Communication is conveniently achieved via the debug port 100 with minimal impact to on-chip application resources. In some cases it is necessary to disable system interrupts. This requires that the RX and TX bits be examined by the processor 100. In this situation, the communication link is driven in a polled mode.

PARALLEL INTERFACE TO DEBUG PORT 100

The serial debug port (SDP) is accessed either with the JTAG-based serial link (JTAG based) or a somewhat more parallel interface. The parallel port 214 interface supports higher code down-load speeds, but is included in a bond-out part. Full-function ICE developers are typical users of the bond-out parts.

A full-function In Circuit Emulator (ICE) uses a dual-ported pod-space memory to gain high speed access to the target system 101 to gain faster down-load speeds than are available with the serial debug port alone. To avoid a relatively complex dual-port design that is different for various target processors, an alternative the T/P input pin is implemented in bond-out versions only and used to switch the bond-out pins from a trace mode to parallel port mode.

Some embedded systems specify that instruction trace is to be examined while maintaining I/O and data processing operations. Without the use of a multi-tasking operating system, a bond-out version of the embedded processor device 102 is preferable to supply trace data since, otherwise, examination of the trace buffer 200 via the debug port 100 requires the processor 104 to be stopped.

In the disclosed embodiment, a parallel port 214 is implemented in an optional bond-out version of the embedded processor device 102 to support parallel command and data access to the debug port 100. The parallel port 214 interface forms a 16-bit data path that is multiplexed with the trace pad interface port 220. More specifically, the parallel port 214 supplies a 16-bit wide bi-directional data bus (PDATA[15:0]), a 3-bit address bus (PADR[2:0]), a parallel debug port read/write select signal (PRW), a trace valid signal TV and an instruction trace record output clock TRACECLOCK (TC). Although not shared with the trace pad interface port 220, a parallel bus request/grant signal pair PBREQ/PBGNT (not shown) are also implemented. The parallel port 214 is enabled by setting a bit in the DCSR. Serial communications via the debug port 100 are not disabled when the parallel port 214 is enabled.

The bond-out TC pin is a trace capture clock, a clock signal that is also used to capture system memory accesses performed on other busses. Capturing system bus activity is used to trace bus activity in conjunction with program trace. The TC clock is preferentially accessed last in a sequence of clock signals since system bus data can be acquired at the time of the TC clock signal. Thus other bus signals are to remain active at the time of the TC clock, or be latched in the ICE preprocessor and held until the TC clock is active.

When the parallel port 214 is selected, rather than the trace port 220, the TC clock is used to read and write parameters in to the Debug Registers 210, a faster process than serially clocking data into the 38-bit JTAG instruction command register.

| Bond-Out Pins/Parallel Port 214 Format | | | | |
|---|---|---|---|---|
| 22 | 21 | 20 | 19 | 16 0 |
| TV | TC | PRW | PADR [2:0] | PDATA [15:0] |

The parallel port 214 is primarily intended for fast downloads/uploads to and from target system 111 memory. However, the parallel port 214 may be used for all debug communications with the target system 111 whenever the processor 104 is stopped. The serial debug signals, either standard or enhanced, are used for debug access to the target system 111 when the processor 104 is executing instructions.

In a manner consistent with the JTAG standard, all input signals to the parallel port 214 are sampled on the rising edge of the test clock signal TCK and all output signals are changed on the falling edge of the test clock signal TCW In the disclosed embodiment, the parallel port 214 shares pins with the trace pad interface 220 so that commands directed to the parallel port 214 are initiated only while the processor 104 is stopped and the trace pad interface 220 is disconnected from the shared bus.

The parallel bus request signal PBREQ and parallel bus grant signal PBGNT are included to expedite multiplexing of the shared bus signals between the trace buffer 200 and the parallel port 214. When the host interface to the parallel port 214 detects that the parallel bus request signal PBREQ is asserted, the host interface begins driving the parallel port 214 signals and asserts the parallel bus grant signal PBGNT.

When entering or leaving DEBUG mode with the parallel port 214 enabled, the parallel port 214 is used for the processor state save and restore cycles. The parallel bus request signal PBREQ is asserted immediately before the beginning of a save state sequence penultimate to entry of DEBUG mode. On the last restore state cycle, the parallel bus request signal PBREQ is deasserted after latching the write data. The parallel port 214 host interface responds to parallel bus request signal PBREQ deassertion by tri-stating its parallel port drivers and deasserting the parallel bus grant signal PBGNT. The parallel port 214 then enables the debug trace port pin drivers, completes the last restore state cycle, asserts the command acknowledge signal CMDACK, and returns control of the interface to trace control circuit 218.

During communication via the parallel port 214, the address pins PADR[2:0] are used for selection of the field of the JTAG instruction register, which is mapped to the 16-bit data bus PDATA[15:0] as shown in the following table:

| PADR[2:0] | Data Selection |
|---|---|
| 000 | No selection (null operation) |
| 001 | 4-bit command register; command driven on PDATA[3:0] |
| 010 | High 16-bits of debug_data |
| 011 | Low 16-bits of debug_data |
| 100–111 | Reserved |

If only a portion of the bits of the debug data [31:0] register are utilized during a transfer, such as on 8-bit I/O cycle data write operations, only the used bits need be updated. The command pending flag is automatically set when performing a write operation to the four-bit command register and is cleared when the command finished flag is asserted. The host system 111 monitors the command acknowledge signal CMDACK to determine when the finished flag has been asserted. Use of the parallel port 214 offers full visibility of execution history without throttling the processor core 104. The trace buffer 200, if needed, is configured for use as a buffer to the parallel port 214 to alleviate bandwidth matching issues.

OPERATING SYSTEM AND DEBUGGER INTEGRATION

In the illustrative embodiment, the operation of all debug supporting features including the trace buffer 200 is controlled through the debug port 100 or via processor instructions. The processor instructions are commonly accessed from a monitor program, a target hosted debugger, or conventional pod-wear. The debug port 100 performs data moves that are initiated by serial data port commands rather than processor instructions.

Operation of the processor from conventional pod-space is very similar to operations in DEBUG mode from a monitor program. All debug operations are controlled via processor instructions, whether the instructions are accessed from pod-space or regular memory, advantageously extending an operating system to include additional debug capabilities.

Operating systems have supported debuggers via privileged system calls such a ptrace( ) call for some time. However, the incorporation of an on-chip trace buffer 200 now enables an operating system to offer instruction trace capability. The ability to trace is often considered essential in real-time applications. In the illustrative improved debug environment, functionality of an operating system is enhanced to support limited trace without the incorporation of an external logic analyzer or in-circuit emulator.

Instructions that support internal loading and retrieving of trace buffer 200 contents include a load instruction trace buffer record command LITCR and a store instruction trace buffer record command SITCR. The command LITCR loads an indexed record in the trace buffer 200 specified by a trace buffer pointer ITREC.PTR with the contents of the EAX register of the processor core 104. The trace buffer pointer ITREC.PTR is pre-incremented, so that the general operation of the command LITCR is described, as follows:

ITREC.PTR←ITRCEC.PTR+1;
ITRREC[ITREC.PTR]←EAX.

If the instruction trace record, in a trace record format described hereinafter, is smaller that the EAX record, only a portion of the EAX register is used.

Similarly, the store instruction trace buffer record command SITCR is used to retrieve and store into the EAX register an indexed record from the trace buffer 200. The contents of the ECX register of the processor core 104 are used as an offset that is added to the trace buffer pointer ITREC.PTR to create an index into the trace buffer 200. The ECX register is post-incremented while the trace buffer pointer ITREC.PTR is unaffected, so that:

EAX←ITREC[ECX+ITREC.PTR];
ECX←ECX+1.

The LITCR and SITCR commands may be configured in numerous variations of formats that are known in the computing and encoding arts.

Extension of the operating system to support on-chip trace has many advantages. In the communications industry, support of on-chip trace maintains system I/O and communication activity while a task is traced. Traditionally, the use of most in-circuit emulators has demanded that the processor be stopped and operating system execution suspended before the processor state and trace are examined, disrupting continuous support of I/O data processing. In contrast, the ptrace( ) capabilities of the illustrative enhanced system allow the processor and operating system to continue execution while trace data is available.

The trace buffer 200 is highly useful in applications controlling field equipment. If an unexpected system crash occurs, the trace buffer 200 can be examined to observe the execution history leading up to the crash event. When used in portable systems or other environments in which power consumption is a concern, the trace buffer 200 can be disabled via power management circuitry. A trace record is read from the trace buffer 200 that includes a record of trace events. A trace event is an action that causes trace records to be generated. Trace events are caused, for example, by x86 instructions, instructions causing an exception, hardware interrupts, trace synchronization events, activation or deactivation of trace capture, and events that change privilege level.

Several x86 instructions generate trace records including software interrupt instructions, BOUND instructions, CALL instructions, interrupt taken and not taken (INT/INTO) instructions, return (RET) and interrupt return (IRET/ IRETD) instructions, jump (JMP) and conditional jump (JCC) instructions, LOOP instructions, MOV CR0 instructions, and the like. A REP prefix does not generate a trace record.

All CALL and CALLS instructions in which the target address is supplied by a register or memory location produce a TCODE=0010 entry. If the target address arises from the instruction (an immediate address) no TCODE=0010 entry is used. If a segment change occurs (a long address) then a TCODE=0011 entry is generated ahead of a TCODE=0010 entry. A segment change entry may be generated even if no target address entry occurs.

An IRET instruction generates a branch target entry, TCODE=0010, which may be preceded by a segment change entry, TCODE=0011. All RET instructions generate branch target entries, TCODE=0010, and may be preceded by a segment change entry, TCODE=0011.

Conditional branch instructions J xx produce a one-bit entry in a BFIELD trace element. The bit is set if the branch is taken, and not set if not taken.

Looping instructions such as LOOP xx are treated like conditional branching instructions. The REP instruction prefix is not treated like a conditional branch and hence not reported, like other instructions which do not disrupt address flow.

All unconditional JMP instructions in which the target address is supplied by a register or memory location produce a TCODE=0010 entry and are handled in the same way as CALL instructions.

All INT imm8, INT3 and INT0 interrupts generate a branch target entry when the interrupt is taken. The entry may be preceded by a segment change entry. The INT0 instruction is conditional on the Overflow Flag being set. If this flag is not set, the interrupt and trace entry are not generated.

The BOUND instruction is a conditional interrupt, like INT0, and is similarly only reported if the interrupt is taken. BOUND is used to ensure that an array index is within specified limits.

A direct move into the CR0 register may be used to change the processors operating mode. Although infrequently done, any such move that results in a mode change is reported in the trace stream.

An instruction causing an exception generates trace records. The trace records generated will report the EIP of the instruction causing the exception, previous segment base address and attributes, the vector number of the exception handler, and the EIP of the target instruction in the interrupt handler.

A hardware interrupt generates trace records that report the EIP of the instruction that was most recently executed before the interrupt was serviced, the previous segment base address and attributes, the vector number of the interrupt handler, and the EIP of the target instruction in the interrupt handler.

A trace synchronization register implemented in the trace controller is used to generate a trace synchronization event. The trace synchronization register is updated from the TSYNC bits of the ITCR register whenever the ITCR is loaded. The trace synchronization register is decremented by 1 when a conditional branch trace record (TCODE=0001) is created. Any other trace record causes the register to be reloaded from the TSYNC bits of the ITCR register. The register counts down to zero and generates a trace event. The trace synchronization is then reloaded from the TSYNC bits of the ITCR register. The TSYNC value represents the maximum number of consecutive conditional branch trace records (TCODE=0001) created before a trace synchronization event occurs. A TSYNC value of 0 disables trace synchronization events.

Trace records are generated when trace capture is turned on. The trace records report the EIP of the instruction at which trace capture was turned on.

Trace records are generated when trace capture is turned off. The trace records report the EIP of the instruction at which trace capture was turned off and optionally the base address and segment attributes of the current segment. Generation of trace records with the current segment base is controlled by the DISCSB bit of the ITCR. If the code segments do not change when the trace capture is turned off, then disabling generation of current segment base trace records prevents generation of redundant trace records.

Trace records are generated upon entering debug mode. The trace records report the EIP of the last instruction executed before entering debug mode and, optionally, the base address and segment attributes of the current segment. Generation of trace records with the current segment base is controlled by the DISCSB bit of the ITCR.

Trace records are generated when exiting debug mode. The trace records report the EIP of the first instruction executed after exiting debug mode.

When entering privilege level ring 0 or 1, a capability to stop trace capture is advantageous, for example, to prevent tracing of system calls. Therefore, when entering lower privilege levels 0 and 1, tracing is optionally turned off via the DISL0TR, DISL1TR bits in the ITCR. If lower privilege level tracing is selected, trace records are generated before transitioning to lower privilege levels 0 and 1. The trace records report the EIP of the last instruction executed before transitioning to the lower privilege level and optionally report the base address and segment attributes of the current segment. Generation of trace records with current segment base is controlled by the DISCSB bit of the ITCR. Trace records for the call, jump, and other instructions that cause the transition to the lower privilege level are also reported preceding the privilege trace records.

If an option to turn tracing off when entering lower privilege levels is set, then when transitioning out of the lower privilege level, trace records are generated. The trace records will report the EIP of the first instruction executed after transitioning out of the lower privilege level.

Note, the trace records for all these trace events can be preceded by a conditional branch trace record if there was a pending conditional branch trace record that had not been stored in the trace buffer or reported to the trace port.

EXEMPLARY TRACE RECORD FORMAT

In the disclosed embodiment of the invention, an instruction trace record is 20 bits wide and includes two fields, TCODE (Trace Code) and TDATA (Trace Data), as well as a valid bit V that indicates if the buffer entry contains a valid trace record. An internal write pointer keeps track of the last location written in the buffer. The write pointer is incremented before a trace record is written to the buffer. The write pointer is reset by writing to the TINIT bit of the ITCR. The V bit indicates an invalid trace record for all trace records greater than the write pointer before the write pointer has wrapped around once. After the write pointer wraps around, all records read back as valid. The TCODE field is a code that identifies the type of data in the TDATA field. The TDATA field contains software trace information used for debug purposes.

| Instruction Trace Record Format | | |
|---|---|---|
| 20 | 19 15 | 0 |
| V | TCODE (Trace Code) | TDATA (Trace Data) |

In one embodiment, the embedded processor device 102 reports eleven different trace codes as set forth in the following table:

| TCODE # | TCODE Type | TDATA |
|---|---|---|
| 0000 | Missed Trace | Not Valid |
| 0001 | Conditional Branch | Contains Branch Sequence |
| 0010 | Branch Target | Contains Branch Target Address |
| 0011 | Previous Segment Base | Contains Previous Segment Base Address and Attributes |
| 0100 | Current Segment Base | Contains Current Segment Base Address and Attributes |
| 0101 | Interrupt | Contains Vector Number of Exception or Interrupt |
| 0110 | Trace Synchronization | Contains Address of Most Recently Executed Instruction |
| 0111 | Multiple Trace | Contains 2nd or 3rd Record of Entry With Multiple Records |
| 1000 | Trace Stop | Contains Instruction Address Where Trace Capture Was Stopped |
| 1001 | User Trace | Contains User Specified Trace Data |
| 1010 | Performance Profile | Contains Performance Profiling Data |

TRACE COMPRESSION

The trace buffer 200 has a limited storage capacity so that compression of the captured trace data is desirable. Trace data is acquired as a program executes on the target system 101, trace data is captured so that an image of the executed program is made available to the host system 111. In one example of a compression technique, if an address is otherwise obtainable from an accessible program image such as an Object Module, then the address is not supplied in the trace data. Preferably, only instructions that disrupt the instruction flow are reported. Only instructions in which the target address is data dependent are reported. For example, disruptive events include call instructions or unconditional branch instructions in which the target address is supplied from a data register or other memory location such as a stack.

CALL instructions are disrupting events in which in almost all cases the target address is supplied by the instruction in immediate format. Therefore, the branch is not reported unless the target address is data dependent, such as supplied from a data register or other memory location such as a stack.

Unconditional Branch instructions, like a CALL has a target address that is usually in immediate format. Unconditional branches are compressed in the same manner as CALL instructions.

Conditional instructions have few data register-dependent target addresses. Therefore the target address is only reported when the address is not in immediate format. Otherwise, a 1-bit trace is used to indicate if the branch was taken or not taken.

Exception events, whether synchronous or asynchronous, are relatively infrequent events. The target address of the trap or interrupt handler is reported in the trace record.

Return instructions pop the target address of the stack before starting a new instruction stream. The target address is supplied in the trace record.

The traced address values are all logical and not necessarily physical. Address information relates to the address space of an executing program and not to an address translation scheme that is utilized. Offset addresses are translated to physical equivalents, typically by adjusting an Extended Instruction Pointer (EIP) value by code segment and selector information. Therefore segment information is reported separately whenever a change occurs.

In a system that uses paging, a virtual or logical address supplied by a process controlling debugging is presented to the target processor including hardware or software support and the corresponding physical address is determined and then supplied to the debugger. Unfortunately conversion to a physical address is difficult if no corresponding physical page is currently in memory. Therefore, operating system involvement is utilized. Paging is unlikely in an embedded processor environment.

Most frequently-recorded trace addresses result from procedure returns. Between the return addresses, a stream of single bits indicating the outcome from branch decisions is typically reported using the Conditional branch TCODE in which the BFIELD is initially cleared except for the left most bit which is set to 1 and the outcome of up to 15 branch events is grouped into a single trace entry. As each new conditional branch is encountered, a new B-bit is added on the left and the entries are all shifted right one-bit. Instructions such as CALLs and unconditional Jumps produce no trace data if the target address is in immediate form.

When a branch target address is reported, the current "BFIELD" entry is marked complete, even if 15 entries are not yet accumulated. The target address is recorded in a trace entry pair. The first entry in the pair supplies the high-order 16 bits (TADDR.H) of the target address. The second entry supplies the low-order 16 bits (TADDR.L) of the target address. When a branch target address is supplied for a conditional jump instruction, no BFIELD entry appears for the reported branch.

The compressed BFIELD trace record that includes single bits designating whether branches are taken or not taken has a potential to cause difficulties in synchronizing trace entries since few trace entries contain address values. When a trace is examined, data is identified with a particular address only to the extent that a known program address is available. For example, starting at the oldest entry in the trace buffer 200, all entries up to an entry containing a known address have no use and are discarded. Algorithm synchronization starts from a trace entry supplying a target address. If the trace buffer 200 contains no address supplying entries, then no trace analysis is possible. A TSYNC register for the serial debug port, which is discussed in further detail hereinafter, is included for injecting an address reference in to the trace data stream.

Other trace information includes a the target address of a trap or interrupt handler, a target address of a return instruction, a conditional branch instruction having a target address which is data register dependent (otherwise, all that is needed is a 1-bit trace indicating if the branch was taken or not), and, most frequently, addresses from procedure returns. Other information, such as task identifiers and trace capture stop/start information, may also be placed in the trace buffer 200. Various data and information of many natures are selectively included in the trace records.

The Missed Trace (TCODE=0000) code is used to indicate that the processor missed reporting some trace records. The TDATA field contains no valid data. A trace execution algorithm typically responds to the Missed Trace TCODE by resynchronizing at the next trace record that includes address information.

The Conditional Branch (TCODE=0001) code is used report the status for conditional branches. The TDATA field contains a bit for each conditional branch. The bit is marked as either taken/not taken. The format of the trace record is shown in FIG. 6A. Each trace record reports status information for a maximum of 15 conditional branches. The record is stored either in the trace buffer 200 or reported to the trace port 220 when 15 conditional branches are executed and the record is complete, or when the record is not complete and a trace event occurs, requiring another type of trace record to be reported. In the disclosed embodiment, the outcome of up to 15 branch events are grouped into a single trace entry. The 16-bit TDATA field, also called a "BPIELD", contains 1-bit branch outcome trace entries, and is labeled a TCODE=0001 entry. The TDATA field is initially cleared except for the left-most bit, which is set to 1. As each new conditional branch is encountered, a new one bit entry is added on the left and any other entries are shifted to the right by one bit. Each conditional branch is marked as either taken (1) or not taken (0). To identify the conditional branch bits, the least significant bit with a 1 value is located and bits to the left are conditional branch bits.

A 256-entry trace buffer 200 allows storage of 320 bytes of information. Assuming a branch frequency of one branch every six instructions, the disclosed trace buffer 200 supports an effective trace record of 1,536 instructions, disregarding call, jump and return instructions.

The trace control circuit 218 monitors instruction execution via processor interface logic 202. When a branch target address is reported, information contained within a current conditional branch TDATA field is marked as complete by the trace control circuit 218, even if 15 entries have not accumulated. The Branch Target (TCODE=0010) code is used to report the target address of a data-dependent branch instruction and always occurs in pairs. Referring to FIG. 6B, the TDATA field of the first record in the pair has the TCODE=0010 and indicates the high-order 16 bits of the Extended Instruction Pointer (EIP) of the target instruction. The TDATA field of the second record in the pair has a Multiple Trace (TCODE=0111) code that indicates the low-order 16 bits of the EIP of the target instruction. The target address, for example in a processor-based device 102 using 32-bit addressing, is recorded in a trace entry pair, with the first entry (TCODE=0010) supplying the high-order 16-bits of the target address and the second Multiple Trace entry (TCODE=0111) supplying the low-order 16-bits of the target address. When a branch target address is supplied in conjunction with a conditional jump instruction, no 1-bit branch outcome trace entry appears for the reported branch.

The Multiple Trace code is used to report records for trace entry with multiple records. The format of this trace record is not fixed and depends on the trace code that report multiple trace records.

STARTING AND STOPPING TRACE CAPTURE

Referring to FIG. 6C, a capability to start and stop trace gathering during selected sections of program execution is advantageous, for example when a task context switch occurs. The Trace Stop (TCODE=1000) code is used to report the address of the instruction at which trace capture was stopped and occurs paired with the Multiple Trace (TCODE=0111) code. The TDATA field of the first record with a TCODE=1000 indicates the high-order 16 bits of the EIP of the instruction at which the trace capture terminated. The TDATA field of the second Multiple Trace record with a TCODE=0111 indicates the low-order 16 bits of the EIP of the instruction at which trace capture stopped. When trace capture is stopped, no trace entries are entered into the trace buffer 200, nor do any entries appear on the bond-out pins of trace port 220. Various known methods are contemplated for enabling and disabling trace capture. For example, x86 commands are supplied for enabling and disabling the trace capture function. Alternatively, an existing x86 command is utilized to toggle a bit in an I/O port location. Furthermore, on-chip breakpoint control registers (not shown) are configured to indicate the addresses at which trace capture is to start and stop. When tracing is halted, a Current Segment Base trace entry (TCODE=0100) and a Multiple Trace entry (TCODE=0111) that record the last trace address is placed in the trace stream. When tracing resumes, a trace synchronization entry (TCODE=0110, TCODE=0111) that contains the address of the currently executing instruction is generated.

Because a debug controller can change the state of the processor core 104 before beginning execution, a trace synchronization entry (TCODE=0110) is generated when leaving Debug mode. A Sync address is then the first address executed on leaving Debug mode.

A useful debug function is a capability to account for segment changes that occur while tracing is stopped. The function is performed by selecting an option to report the segment base address and segment attributes of the current code segment using a Current Segment Base (TCODE=0100) entry, shown in FIG. 6C, which occurs in pairs with a second Multiple Trace (TCODE=0111) entry. The TDATA field of the first record with a TCODE=0100 indicates the high-order 16 bits of the current segment base address. The TDATA field of the second Multiple Trace record with a TCODE=0111 indicates the low-order bits 15-4 of current segment base address and the current segment attributes.

The segment attributes report status for paging (PG), operand sizes (SZ), and addressing modes, either real or protected (R/P). The address reported in the records only identify bits 314 of the base address. The operand size (SZ) bit indicates the operand size and addressing mode and reflects the D bit of the code segment descriptor with 1 indicating a 32-bit operand and addressing mode and 1 indicating a 16-bit operand and addressing mode. The paging status (PG) indicates if paging is enabled (1) or disabled (0) and reflects the PG bit of the CR0 register. The Read/Protected bit (RIP) indicates real mode (0) or protected mode (1) and reflects the PE bit of the CR0 register. If the segment is not aligned to a 16-byte boundary, the low-order 4 bits of the base address are determined from the object module file of the program or from the descriptor tables.

The Current Segment Base records occur whenever trace capture is turned off, and when debug mode is entered. Generation of trace records with the Current Segment Base are controlled by the DISCSB bit of the ITCR. The Current Segment Base records function is also performed using a configuration option that enables a current segment base address entry at the end of a trace prior to entering Debug mode. Conversely, when the segment base does not change, such as when an interrupt occurs, supplying segment base information is typically not desirable.

The processor core 104 can enter Debug mode via an exception or other interrupt or command. No trace capture occurs while executing in Debug mode. A trace entry is generated by the exception event, including a SDP command causing entry to Debug mode. A trace-stop entry is not generated following the exception-event entry. A configuration option is supported that enables a current-segment base address entry (TCODE=0100) to be placed at the end of the trace when entering Debug mode.

The interrupt (TCODE=0101) code is used to report an exception or hardware interrupt and occurs in triplicate with two consecutive Multiple Trace codes (TCODE=0111). Referring to FIG. 6D, following the occurrence of an asynchronous or synchronous event such as an interrupt or trap, a TCODE=0101 trace entry is generated to supply the address of the target interrupt handler. The TDATA field of the first record with a TCODE=0101 indicates the vector number of the exception/interrupt handler. A System Management Interrupt (SMI) is reported with a TDATA value set to FFFFh. The TDATA field of the second Multiple Trace record with a TCODE=0111 indicates the high-order 16 bits of the Extended Instruction Pointer (EIP) of the target instruction. The TDATA field of the third Multiple Trace record with a TCODE=0111 indicates the low-order 16 bits of the EIP of the target instruction. The target instruction is the first instruction of the exception/interrupt handler.

When an asynchronous or synchronous event such as an interrupt or trap occurs, merely generating a interrupt (TCODE=0101) code alone is insufficient. The interrupt code supplies the address of the target interrupt handler, but does not reveal the address of the instruction interrupted. The address of the instruction which was interrupted by generating a trace synchronization (TCODE=0110) entry immediately prior to the interrupt entry is advantageously recorded along with the previous segment base address (TCODE=0011). The trace synchronization entry contains the address of the last instruction retired before the interrupt handler commences.

The Trace Synchronization (TCODE=0110) code is used to report the address of the currently executed instruction. The Trace Synchronization code always occurs in pairs with the second Multiple Trace TCODE=0111. The TDATA field of the first record with a TCODE=0110 indicates the high-order 16 bits of EIP of the currently executed instruction. The TDATA field of the second Multiple Trace record with a TCODE=0111 indicates the low-order 16 bits of EIP of the currently executed instruction. The records occur when an exception or interrupt is taken, a trace synchronization event occurs, trace capture is turned on, debug mode is exited, and transitioning out of lower privilege levels if that option has been set in the ITCR register.

SEGMENT CHANGES

A segment change should not occur while tracing is stopped since the event will not be recorded in the trace. Segment change difficulties are partially resolved by selecting an option to immediately follow a Trace Stop TCODE=1000 entry with a current-segment base entry. Referring to FIG. 6E, a trace entry used to report a change in segment parameters is shown. During processing of a trace stream, trace address values are combined with a segment base address to determine an instruction's linear address. The base address, as well as the default data operand size (32 or 16-bit mode), are subject to change. As a result, the TCODE=0011 and TCODE=0111 entries, which always occur in pairs, are configured to report information for accurately reconstructing instruction flow. The Previous Segment Base (TCODE=0011) code is used to report the segment base address and segment attributes of the previous code segment. The TDATA field of the first record with a TCODE=0011 entry indicates the high-order 16-bits of the previous segment base address. The associated second Multiple Trace record with a TCODE=0111 entry indicates the low-order 15-4 bits of the previous segment base address and the previous segment attributes. The segment attributes report status for paging (PG), operand sizes (SZ), and addressing modes, either real or protected (R/P) the same as the segment attributes report status for the Current Segment Base (TCODE=0100) that is discussed in conjunction with FIG. 6C.

The Previous Segments Base records occur whenever a trace event causes instruction execution to begin in another segment or whenever a change in segment attributes occurs. Note that the previous segment refers to the segment from which instruction execution arose. The segment information generally relates to the previous segment, not a current (target) segment. Current segment information is obtained by stopping and examining the state of the processor core 104.

USER SPECIFIED TRACE ENTRY

Under some circumstances an application program or operating system advantageously adds additional information into a trace stream. In one example, an x86 instruction is supported that enables a 16-bit data value to be placed in the trace stream at a selected execution position. The instruction is implemented as a move to I/O space with the operand supplied by memory or a register. When the processor core 104 executes the x86 instruction, the user-specified trace entry is captured by the trace control circuit 218 and placed in the trace buffer 200. Referring to FIG. 6F, the User Trace (TCODE=1001) entry indicates a user-specified trace record and inserts the selected additional information into the trace stream such as a previous or current task identifier when a task switch occurs in a multi-tasking operating system.

The User Trace (TCODE=1001) entry is also useful with a multitasking operating system. For example all tasks may run with a segment base of zero and paging is used to map the per-task pages into different physical addresses. A task switch is accompanied by a segment change. The trace entry for the segment change reports little information, merely a zero base address. During task switching, the operating system may generate a User Trace (TCODE=1001) entry indicating more information, the previous task or the current task identifier.

SYNCHRONIZATION OF TRACE DATA

During execution of typical software on a processor-based device 102, few trace entries contain address values. Most entries have the TCODE=0001 format and a single bit indicates the result of a conditional operation. When examining a trace stream, however, data is only studied in relation to a known program address. For example, starting with the oldest entry in the trace buffer 200, all entries until an address entry have little use. Algorithm synchronization typically begins from a trace entry supplying a target address.

If the trace buffer 200 contains no entries with an address, then trace analysis cannot occur, a rare but possible condition. For this reason, a synchronization register TSYNC is supplied to control the injection of synchronizing address information. If the synchronization register TSYNC is set to zero, then trace synchronization entries are not generated.

| Trace Entry Synchronization Entry Control Register | |
|---|---|
| 6 | 0 |
| TSYNC (Trace Synchronization) | |

Referring to FIG. 6G, an exemplary trace synchronization entry is shown. During execution of the processor core 104, a counter register is set to the value contained in the synchronization register TSYNC whenever a trace entry containing a target address is generated. The counter is decremented by one for all other trace entries including each TCODE=0001 (BFIELD-type) trace entries. If the counter reaches zero, a trace entry is inserted (TCODE=0110) containing the address of the most recently retired instruction (or, alternatively, the pending instruction). When a synchronizing entry is recorded in the trace buffer 200, the entry also appears on the trace pins 220 to ensure sufficient availability of synchronizing trace data for full-function ICE equipment.

The TSYNC value is optionally programmed to adjust the trade off between trace buffer 200 efficiency and ensuring an address is available for trace analysis. A synchronizing entry that is recorded in the trace buffer 200, is also output to the trace pins to ensure sufficient availability of synchronizing trace data for the full-function in-circuit emulation equipment.

Trace entry information is also expanded to include data relating to code coverage or execution performance. The information is useful, for example, for code testing and performance tuning. Even without these enhancements, enabling the processor core 104 to access the trace buffer 200 is useful. In the case of a microcontroller device, the trace buffer 200 is accessed by mapping the trace buffer 200 within a portion of I/O or memory space. A more general approach involves including an instruction that supports moving trace buffer 200 data into system memory.

The foregoing describes a processor-based device providing a flexible, high-performance solution for furnishing instruction trace information. The processor-based device incorporates an instruction trace buffer supplying trace information for reconstructing instruction execution flow on the processor without halting processor operation. Both serial and parallel communication channels are supported for communicating trace data to external devices. The disclosed on-chip instruction trace buffer alleviates various of the bandwidth and clock synchronization problems that arise in many existing solutions, and also allows less expensive external capture hardware to be utilized.

A signal definition includes two sections, a standard section and a bond-out section. Standard signals are shown in TABLE I and are available for usage on all embedded processor device 102 integrated circuits. Bond-out signals are shown in TABLE II and are available only on specially-packaged parts, typically for usage by in-circuit emulation (ICE) vendors. A TBUS[18:0] is shared between the parallel port 214 and the trace pad interface 220. The remaining bond-out signals are dedicated to either the parallel port or the trace pad interface 220.

TABLE I

Standard Signals

| Name | I/O | Res | Sync Clock | Description |
|---|---|---|---|---|
| TCK | Input | PD | — | Clock for TAP controller and debug serial/parallel interface |
| TDI | Input | PD | TCK | Input test data and instructions |
| TD0 | Output | — | TCK | Output data |
| TMS | Input | PD | TCK | Test functions and sequence of test changes |
| TRST | Input | PU | Async | Test reset |
| BRTC | Input | PD | Async | Request entry to debug mode/On-Off switch for instruction trace capture. Function selected by BRKMODE bit in DCSR (optional) |
| CMDACK | Output | — | TCK | Acknowledge command (optional) |
| STOPTX | Output | — | Async | Asserted high on entry to DEBUG mode when normal execution is terminated. Set high in NORMAL mode when data is to be transmitted to the host during OS/Application communication. |
| TRIG | Output | — | Async | Trigger event to logic analyzer, typically for external trace capture (optional) |

TABLE 2

Bond-out Signals

| Name | I/O | Res | Sync Clock | Description |
|---|---|---|---|---|
| TRACECLK | Output | — | — | Instruction Trace record output clock |
| TV | Output | — | TRACECLK | 0 = Valid Trace record, 1 = No Trace record. Pin is not shared with parallel bus interface |
| PDATA[15:0] | Bidir | PD | TCK/ TRACECLK | Parallel debug port data path. Shared with pins TBUS[15:0]. |
| PADR[2:0] | Bidir | PD | TCK/ TRACECLK | Parallel debug port address. Shared with pins TBUS[18:16]. |
| PRW | Bidir | PD | TCK/ TRACECLK | Parallel debug port read/write select. Shared with pin TBUS[19]. 1 = Parallel read from serial debug register. 0 = Parallel write from serial debug register. |
| PBREQ | Output | — | TCK | 1 = Request Host to enable parallel bus interface. 2 = Request Host to disable parallel bus interface. Pin is not shared with Trace bus interface. |
| PBGNT | Input | PD | TCK | 1 = Host-enabled parallel bus interface. 0 = Host-disabled parallel bus interface. Pin not shared with Trace bus interface. |

The trace port 220 is available only on bondout chips. The TBUS pins are shared with the parallel debug port 214 if the parallel option has been enabled by setting the PARENB bit in the DCSR. Trace records generated by the processor core 104 are sent to the trace port 220 in external trace mode. The trace port signals are shown in TABLE 2. The TRACECLK timing is programmable through bits in the ITCR. The trace port signals transition synchronous to the TRACECLK signal. The TV signal asserts when valid trace data is driven on the TBUS. The TBUS signals are to be sampled on the next rising edge of the TRACECLK signal after assertion of TV.

Figure 7:
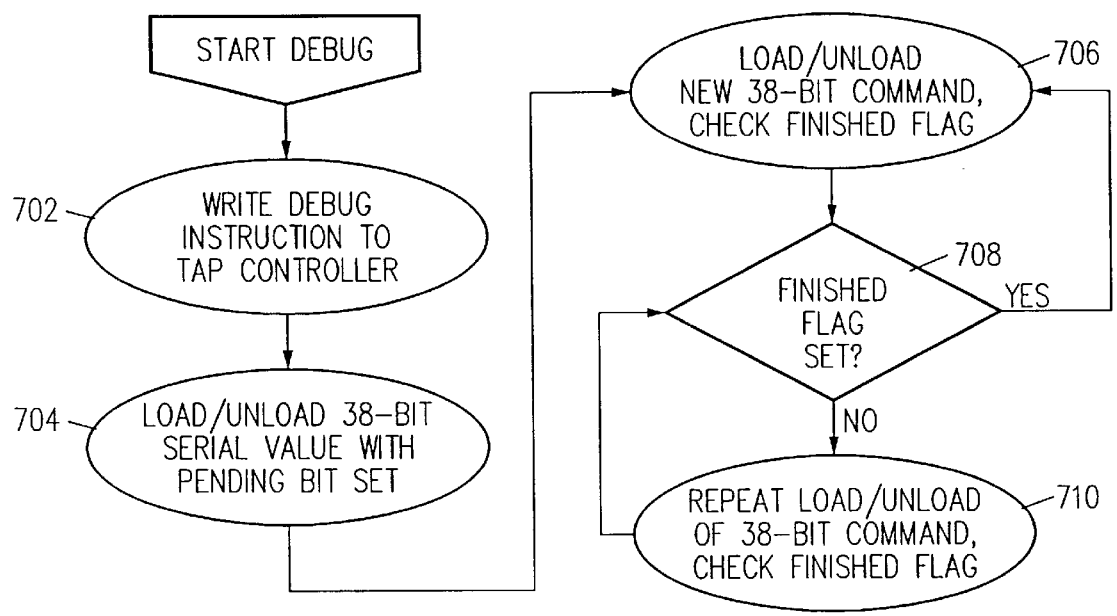
FIG. 7 is a state diagram illustrating states of a standard JTAG interface access operation.

Referring to FIG. 7, a state diagram illustrates a high-level flowchart of the host/serial port interface of the JTAG TAP controller 204 when using standard JTAG communication. The host system 111 writes a DEBUG instruction to the JTAG TAP controller 204 in operation 702, shifting a 38-bit instruction value into the JTAG instruction register with the Command Pending Flag (P) asserted and data (if applicable, otherwise zero) in the data field in operation 704. Upon completing the command, which typically involves transferring a value between the data field of the JTAG instruction register and a predetermined processor register or memory/IO location in the processor core 104, the processor core 104 clears the Pending flag (P=0) and asserts the Finished flag (F=1), simultaneously storing a value in the data field, if applicable. The entire 38-bit register is scanned out to monitor the Finished (F) and Pending (P) flags. If the Pending flag P is reset to zero and the Finished flag F is set to one, the previous command is finished. The status of the flags is captured during the Capture-DR TAP controller state shown in FIG. 3. A slave copy of the flag status is saved internal to the JTAG TAP controller 204 and checked in operation 706 to determine in logic state 708 whether the next instruction is to be loaded in the Update-DR TAP controller state. If the Finished flag (F) is set, a new 38-bit command is scanned in operation 706, otherwise the previous data scan is repeated in operation 710. A slave copy is maintained due to the possibility of the status changing between the Capture-DR and Update-DR TAP controller states. The processor saves the slave copy to determine the status the user will detect at the time the status capture is performed to prevent the loading of the next instruction if the user sees that the previous instruction has not finished.

Referring again to FIG. 2, the processor interface state machine 202 performs asynchronous control operations for adding the signals CMDACK, BRTC, STOPTX, and TRIG to the standard JTAG interface. The CMDACK, BRTC, STOPTX, and TRIG signals are enabled when the DEBUG instruction is written to the JTAG instruction register in the JTAG TAP controller 204, but forced to a logic zero when disabled. The BRTC signal pin is supplied with an internal pull-down resistor (not shown).

Figure 8:
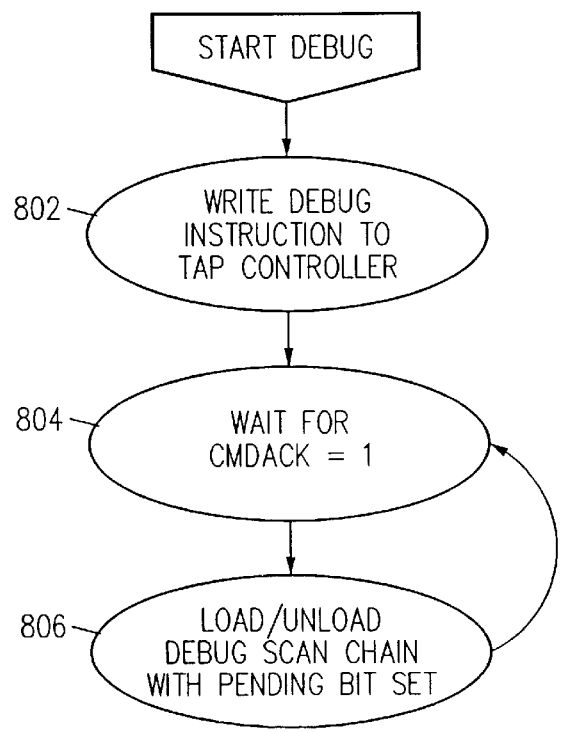
FIG. 8 is a state diagram illustrating states of an enhanced JTAG interface access operation.

Referring to FIG. 8, a flow diagram illustrates state operation of the enhanced JTAG interface. The host system 111 writes a DEBUG instruction to the JTAG TAP controller 204 in operation 802 then optionally monitors the output signal CMDACK to determine command completion status in a logic operation 804. The CMDACK signal is asserted high simultaneous with assertion of the Finished flag (F) and remains high until the next shift cycle begins. When using the CMDACK pin, the Finished flag (F) status is captured without shifting out the serial port register of the JTAG TAP controller 204 since the CMDACK pin transitions high on the next rising edge of TCK after the real-time status of the Finished flag (F) changes from 0 to 1. The CMDACK signal is not delayed from the state saved during the previous Capture-DR state entry of the TAP controller state machine. Accordingly, in the enhanced JTAG mode a new shift sequence is not started in operation 806 until the CMDACK pin is asserted high. The CMDACK pin asserts high when the serial port is ready to receive instructions after the DEBUG instruction is loaded into the JTAG instruction register. The CMDACK signal is synchronous with the TCK signal. TCK is generally not be clocked at all times, but is clocked continuously when waiting for a CMDACK response.

The BRTC input signal functions either as a break request signal or a trace capture enable signal depending on the BRKMODE bit in the DCSR. The BRTC signal, when set to function as a break request signal, is pulsed to cause the host system 111 to enter debug mode. If the BRTC signal is set to function as a trace capture enable signal, asserting the signal high activates the trace capture. Deasserting the BRTC signal deactivates the trace capture. The BRTC signal takes effect on the next instruction boundary after detection and is internally synchronized with the internal processor clock. The BRTC signal is asserted at any time.

The TRIG output signal is optionally enabled to pulse whenever an internal breakpoint in the processor core 104 is asserted. The TRIG signal event is typically used to trigger an external capturing device such as a logic analyzer. The TRIG signal is synchronized with TRACECLK, the trace record capture clock. When the processor core 104 generates a breakpoint or, more precisely a pulse point, the TRIG output signal event is synchronized with TRACECLK and pulsed for one TRACECLK period. In the illustrative embodiment, conventional debug breakpoints DR0–DR3 are modified to alternatively generate a pulse without the processor stopping in the manner of a breakpoint event.

The STOPTX output signal is asserted high when the host system 111 enters debug mode and is ready for register interrogation and modification, or memory or I/O reads and writes through the serial/parallel command interface. In a normal (nondebug) mode, the STOPTX signal is asserted high when the host system 111 is ready to transmit data during Operating System (OS) or Application communication. The STOPTX signal reflects the state of bit 7 or bit 11 in the debug control/status register (DCSR). The STOPTX signal is synchronous with TRACECLK. When external instruction tracing through the bond-out DEBUG trace port is enabled, assertion of STOPTX is delayed until all data in the instruction trace buffer 200 is transferred out.

Referring again to FIG. 2, the parallel port 214 is a high-performance interface that is typically available in the bond-out version of the target system 101. The parallel port 214 supplies a 16-bit data path is intended to perform fast downloads and uploads between the host system 111 and the target system memory. The parallel port 214 is optionally used for all debug communication with the target system 101 whenever the processor core 104 is stopped. The serial port interface, either standard or enhanced, is used for debug access to the target system 101 when the processor core 104 is executing instructions.

The parallel port 214 includes a 16-bit wide bidirectional data bus PDATA[15:0], a two-bit address bus PADR[2:0], a read/write strobe PRW, and a request-grant pair PBREQ-PBGNT. The interface uses TCK (see Table 1) for synchronization of all transactions. TCK is continually clocked while the parallel debug interface is enabled.

The parallel port 214 is enabled by setting DCSR:3 to logic 1 via the serial port of the JTAG TAP controller 204. The serial port interface is not disabled when the parallel port is enabled and is mandatory for access while the processor core 104 is executing instructions. Any transaction started on the parallel port 214 completes on the parallel parallel port 214. Similarly, any transaction begun on the serial port of the JTAG TAP controller 204 also completes on the serial port. In the illustrative embodiment the parallel parallel port 214, when enabled, is used for all save state and restore state cycles to avoid unpredictable behavior.

All input signals to the parallel port 214 are sampled on the rising edge of TCK. All output signals are changed on the falling edge of TCK.

Figure 9:
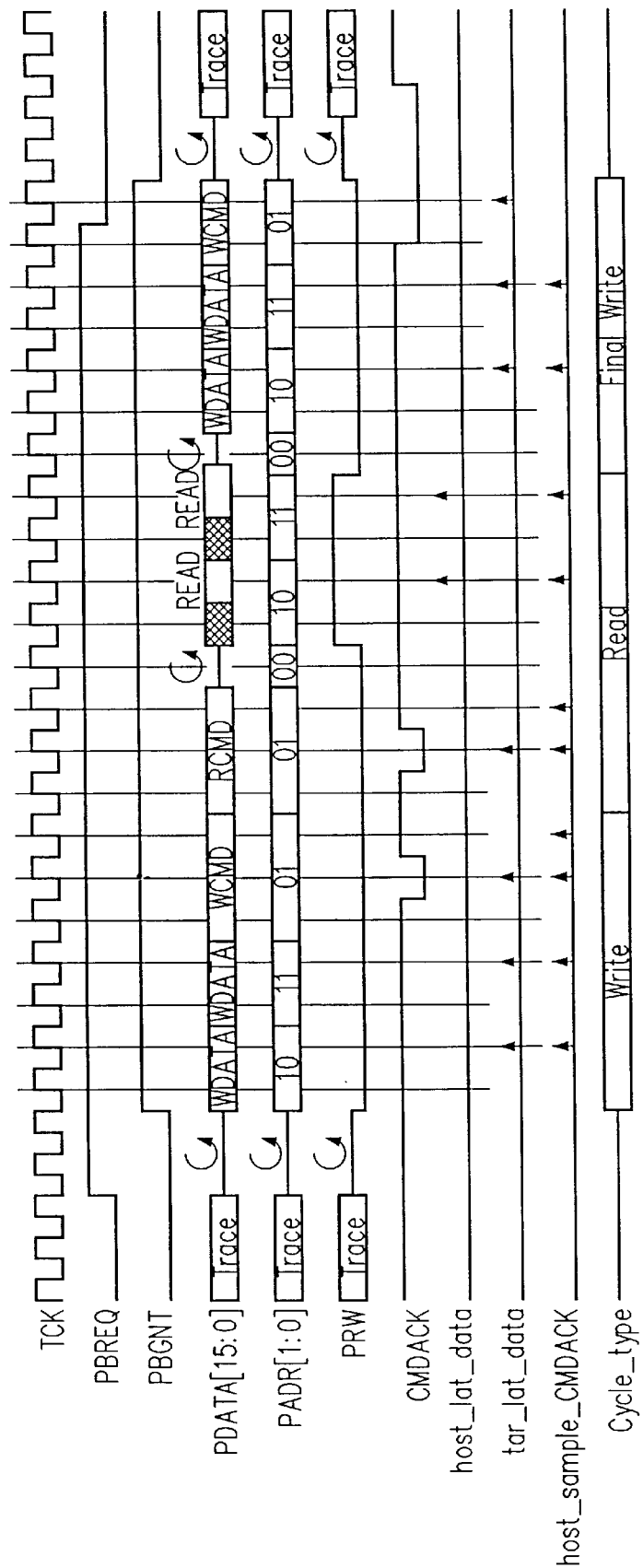
FIG. 9 is a timing diagram showing signal behavior for acquisition and release of a parallel debug bus.

Referring to FIG. 9, a timing diagram illustrates three complete bus cycles of signal behavior for acquisition and release of a parallel debug bus PDATA[15:0] and PADR [2:0]. Because pins are shared between the parallel port 214 and the DEBUG trace port 220, parallel port transmission commands are initiated only while the processor core 104 is stopped and the DEBUG trace port 220 is disconnected from the shared bus. A request-grant handshake pair of signals PB REQ/PB GNT are supplied to expedite turnaround of the shared bus signals between the DEBUG trace port 220 and the parallel port 214. When the host system 111 interface to the parallel parallel port 214 determines that PBREQ is asserted high, the host system 111 is to begin driving the parallel port 214 signals and assert PBGNT. When PBREQ is deasserted, the host system 111 interface to the parallel port 214 responds by tri-stating host system 111 interface signals and deasserting PBGNT to indicate that the host system 111 interface is isolated from the bus. To prevent bus contention, devices driving the parallel port 214 are tri-stated whenever PBGNT is deasserted.

The PBREQ signal is asserted immediately before beginning a save state sequence penultimate to debug mode entry and is deasserted after the last restore state sequence data word is transferred. When the debug mode is either commenced or terminated when the parallel port 214 is enabled, the parallel parallel port 214 is used for processor core 104 state save and restore cycles. On the last restore state cycle, the parallel port 214 controller deasserts the PBREQ signal after latching the write data. The CMDACK instruction is not yet asserted because the processor core 104 is not released to execute code until the DEBUG trace port is available. The parallel port 214 host interface responds to the PBREQ deassertion by tri-stating the parallel port 214 drivers and deasserting the PBGNT signal. The parallel port 214 controller then activates the DEBUG trace port pin drivers in the debug trace port 220, completes the last restore state cycle, asserts the CMDACK signal, and returns control of the debug trace port 220 interface to the trace control circuit 218.

In FIG. 9, the abbreviations are as follows: WDATA= Write Data; READ=Read Data; WCMD=Write Command; RCMD=Read Command; and Trace=Instruction Trace Record. Host_lat_data is an illustrative signal showing when the host system latches read data. Tar_lat_data is an illustrative signal showing when the parallel port controller latches host data/commands and processor data. PDATA, PADR, PRW, and PBGNT must meet set up and hold times, determined from the rising edge of TCK. Host_sample_ CMDACK is an illustrative signal showing when the host system samples CMDACK. Cycle_type is an illustrative signal showing the types of parallel bus cycles occurring in the diagram. PRW and PADR[1:0] must be driven stable on any rising TCK edge on which PBGNT is asserted. IF PBGNT is asserted and PRW is low, PDATA[15:0] must also be driven stable on all rising edges of TCK. In the actual system, a read cycle would not immediately precede a Final Write, which would be the last cycle of a state restore sequence consisting of multiple consecutive writes. Also, the first cycle after entering debug mode would normally be a state save read cycle.

Figure 10:
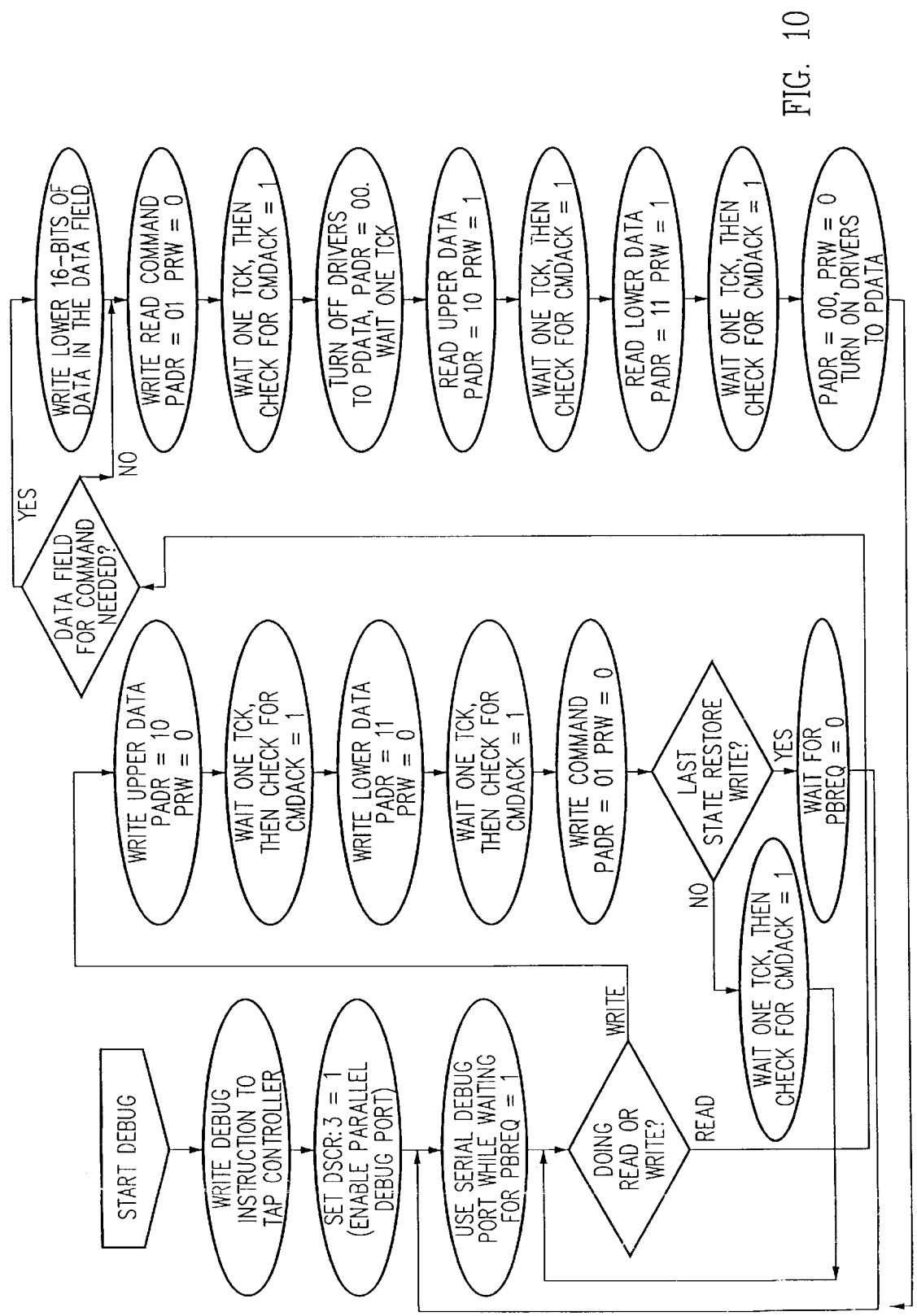
FIG. 10 is a flow chart depicting a parallel debug port interface protocol followed by the host system during communications via the parallel port.

Referring to FIG. 10, a flow chart depicts a parallel debug port interface protocol followed by the host system 111 during communications via the parallel port 214. Address pins PADR[2:0] select the field of the 38-bit internal debug register that is mapped to the 16-bit data bus PDATA[15:0]. The field is selected from among a null selection, the right 16 bits of debug data, the left 16 bits of debug data, and a four-bit command register (PDATA[3:0]). The internal pending flag (P) is automatically set when performing a write operation to the 4-bit command register, and is cleared when the Finished flag (F) is asserted. The host system 111 typically monitors the CMDACK pin to determine when the Finished flag (F) is asserted. On read cycles, PADR is set to 00 for one clock cycle before and after reading data to allow for bus turn-around.

The JTAG instruction register, also called a serial/parallel debug command register, uses the 4-bit command field cmd[3:0] to point to the various internal registers and functions in the JTAG TAP controller 204 interface. The serial/parallel debug command register is accessible only via the serial/parallel debug interface of the JTAG TAP controller 204. Some of the commands use bits from the debug data field as a sub-field to extend the number of available commands. Table 3 is a map of available functions.

TABLE 3

Serial/Parallel Debug Register Command Code Map

| Command Code | | Definition |
|---|---|---|
| 0000 | | Null (not recognized by hardware, Finished flag not set) |
| 0001 | | Load Soft Address register |
| 0010 | | General register read |
| 0011 | | General register write |
| 0100 | | Serial/parallel Debug register read |
| 0101 | | Serial/parallel Debug register write |
| 0110 | | reserved |
| 0111 | | Miscellaneous Serial/parallel Debug functions per debug_data[3:0] |
| | 0 | Exit via RESET (hard reset) |
| | 1 | Exit via SRESET (soft reset) |
| | 2 | Instruction step (may destroy soft address). Bit 7 of the Debug Control/Status register or the external STOPTX pin is monitored to determine when the instruction step is completed. Unlike TF bit, the command steps into interrupts. |
| | 3 | Peripheral reset (CPU not reset) |
| | 4 | Read trace buffer at displacement given in soft address |
| | 5 | Exit to instruction at EIP |
| | * | Null |
| 1000 | | 8-bit memory write to [soft address] |
| 1001 | | 16-bit memory write to [soft address] |
| 1010 | | 32-bit memory write to [soft address] |
| 1011 | | 8-bit output to [soft address] (I/O cycle) |
| 1100 | | 16-bit output to [soft address] (I/O cycle) |
| 1101 | | 32-bit output to [soft address] (I/O cycle) |
| 1110 | | Input or read per debug_data[3:0] |
| | 0 | 8-bit read from [soft_address] |
| | 1 | 16-bit read from [soft_address] |
| | 2 | 32-bit read from [soft_address] |
| | 3 | 8-bit input from [soft_address] (I/O cycle) |
| | 4 | 16-bit input from [soft_address] (I/O cycle) |
| | 5 | 32-bit input from [soft_address] (I/O cycle) |
| | * | Null |
| 1111 | | read/write/restore data |

The Load Soft Address register command places a new 32-bit value for the soft address pointer in the debug data[3 1:0] field in combination with the command code and the pending bit (P). Debug logic transfers the data to the Soft Address register and asserts the Finished flag (F) and the CMDACK signal.

The Memory or I/O read or write command is issued following a command that sets an address and port designation in the Soft Address register. For a read command, data is transferred directly to the debug data register when the Finished flag (F) and CMDACK pin is set. For a write command, data is supplied in the debug data register in combination with the command in the Debug Command register. The address is postincremented by the appropriate size for any read/write transfer to allow block transfers without continually setting up the Soft Address. On memory accesses of a microcontroller with multiple physical memory spaces, the appropriate chipset mapping registers are set prior to issue of the access command. Memory accesses occur as data accesses. A memory access is directed either to normal memory space or SMM space based on the setting of the SMMSP bit in the DCSR.

Issue of a General or Serial/parallel Debug Register Read command includes designation of a register address in the debug data register in combination with identification of the command in the Debug Command register. The address is transferred to the Soft Address register as a side effect to simplify read/modify/write setting of individual bits, and the register contents are transferred directly to the debug data register when the Finished flag/CMDACK pin is set.

For a General or Serial/parallel Debug Register Write command, the Soft Address is used to hold the register address. The soft address is set up with a previous Read Register or Load Soft Address command. The data to be written is supplied in the debug data register in combination with the command in the Command register.

In some embodiments, Read/Write and Save/Restore Data commands include state save reads and state restore writes. For state save read commands, the command code is loaded with the Pending bit (P) asserted. When the Finished flag (F) is set or CMDACK is asserted, the save state data is placed in debug_data[3 1:0]. If no save state data is left to read, the command field cmd[3:0] reads back all zeros. If additional save state data is available to read, the command field cmd[3:0] reads back all ones. On state restore write commands, restore data is loaded into debug_data[3 1:0] with the command code and the Pending bit (P) set. When the Finished flag (F) and CMDACK pin are set, and the command field cmd[3:0] reads back all ones, the processor is ready for the next restore transaction. When the Finished flag (F) and CMDACK pin are set and the command field cmd[3:0] reads back all zeros, the state restore is complete. The save/restore commands may be avoided in embodiments that do not utilize context switching.

The Read Trace Record command implements read access to the 256-record internal trace buffer 200 when the internal instruction trace configuration is selected. The read trace record command is not applicable to an external trace configuration since all trace record data is output to the bond-out DEBUG trace port upon generation. The read trace record command is invoked by setting bit 0 of the Instruction Trace Configuration Register (ITCR) to logic 1 to enable the instruction trace buffer 200, then the internal trace configuration is selected by setting bit 3 of the ITCR register to 0.

The Read Trace Record command reads the 21-bit trace record at the displacement given in the soft address register, places the record in bits 20:0 of the debug data register and asserts the finished flag and CMDACK pin. The soft address register is post-incremented so that a subsequent read retrieves the next location in the buffer in reverse order of history. A read operation from displacement 0 retrieves the most recent trace record. A read operation from displacement 255 retrieves the oldest trace record in the buffer. When the instruction trace buffer 200 is read, the valid bit on each record is to be checked. If the valid bit of a record is zero, an event that occurs only when one or more of the 256 locations of the buffer is not loaded with trace record data since last initialized, the record should be discarded. The trace buffer 200 wraps around and continually overwrites the oldest data when full. Once the buffer has wrapped around, all valid bits are set, and are cleared only when the TINIT bit (bit 2) in the Instruction Trace Configuration Register is set.

The Peripheral reset command sends a reset signal to all system logic except the processor core 104 to be pulsed active and released. The peripheral reset command allows peripheral logic to be reinitialized without resetting the processor core 104.

A command to enter or exit Debug mode enables and disables debug functionality. Debug functions are enabled by writing the DEBUG instruction to the JTAG TAP controller. When a DEBUG instruction is received, the debug serial port register is enabled to receive commands. While the processor is executing instructions only the Debug Control/ Status register, Instruction trace configuration register, RX_DATA, and TX_DATA registers are accessed through the serial interface. All serial debug registers become accessible when the processor has stopped. The processor may be stopped (forced into debug mode) by one of the following methods:

Setting bit 1 of the Debug Control/Status register (DCSR)
Pulsing the BRTC pin (low-to-high transition)
Via legacy processor core 104 debug registers DR0–DR3 after setting bit 4 of the Debug Control/Status register (DCSR). Single stepping with the TF bit set causes entry to debug mode when DCSR bit 4 is set. Moving to and from debug registers with the GD bit of DR7 set causes entry to debug mode when DCSR bit 4 is set.
Executing a EDEBUG instruction. Inserting a EDEBUG instruction into the code stream enters debug mode at a specific, arbitrary point in source code. The processor core 104 is set in debug mode (DEBUG instruction must have been written to the TAP controller) or the EDEBUG instruction causes an invalid opcode exception.

The external pin STOPTX or bit 7 of the Debug Control/ Status register (DSCR) is optionally monitored to determine when the processor enters debug mode. The flushing of cache on entry to debug mode is controlled by the DIS-FLUSH bit of DCSR. If the bit is reset the cache is flushed (using the SLE486 FLUSH pin) upon entry to debug mode. If the bit is set the cache is not flushed on entry to debug mode. A partial state save is utilized upon entry to debug mode. On receipt of the STOPTX signal, either by sampling of the STOPTX pin or by polling DCSR bit 7, the host system 111 performs a series of reads using command code 1111b before entry to debug mode is complete. The restore data is read from the parallel port interface if the interface is enabled, otherwise the restore data is read from the serial port.

Debug mode is exited through command 0111. The exit options include:
Exit and begin execution at current value of EIP. In one example, the processor jumps to a section of patch code. A breakpoint is set at the end of the patch code to enable reentry to debug mode. In another example, the processor state is restored to the original debug entry state, using the general register write commands, before exiting. A partial state restore is performed before execution resumes.
Exit and perform a single instruction step. A partial state restore is performed. The processor executes a single instruction, takes a trap, and reenters debug mode, performing a partial state save.

Exit via a hard reset. No state restore performed. A hard CPU reset is asserted immediately.

Exit via a soft reset. A state restore is performed before the soft CPU reset asserted.

In embodiments that employ context switching, before completing an exit from debug mode the processor core 104 performs a partial state restore, except on a hard reset, retrieving the data saved on entry to debug mode. The host supplies the data by a series of writes using command code 1111b before execution resumes. The host optionally modifies the data saved. The restore data is written to the parallel port interface if enabled, otherwise the restore data is written to the serial port.

The X86 Enhanced Software debug mode supplies a trace and breakpoint interrupt debug functionality on the processor core 104 without inclusion of external debug hardware. The mode is enabled by setting DR7 bit 12. The serial interface does not need to be enabled. When the X86 Enhanced Software debug mode is enabled, access and control of the instruction trace buffer 200 and the ITCR (Instruction Trace Control Register) are supplied through a set of reserved instructions. The instructions cause an illegal opcode exception if executed when DR7 bit 12 is not set.

Debug control and status is configured by setting the Debug Control/Status Register (DCSR) through the Serial/Parallel debug interface, using the serial/parallel debug registers read/write command, address 00. DCSR control and status bits are described, as follows:

Bit 0 (FRESET) is a reset bit allowing the host system 111 to completely reset all devices on the target system 101 other than the Serial/Parallel controller. FRESET is useful in the event of a total target system crash.

Bit 1 (FBRK) is a register version of the BRTC pin. The host system 111 writes a 1 to FBRK to force a break into debug mode at the next instruction boundary following synchronization of the received command with the internal processor clock.

Bit 2 (DSPC) is a processor clock disable bit for disabling the stopping of internal processor clocks that normally occurs when entering Halt and Stop Grant states. DSPC allows the processor to continue to respond to break requests while halted or in the Stop Grant state.

Bit 3 (PARENB) is a parallel port enable bit that enables the auxiliary parallel data port. PARENB is not set on non bond-out versions of the target system 101.

Bit 4 (DBTEN) is a debug trap enable bit that causes entry into a hardware debug mode for all debug traps/faults of the processor core 104 that otherwise cause a software INT 1. The trace mode on/off toggling control in the ITCR has priority over DBTEN in that breakpoints mapped for trace mode on/off toggling are not affected by setting of DBTEN.

Bit 5 (BRKMODE) is a bit for controlling entry into debug mode. BRKMODE allows a developer to change the functionality of the BRTC pin to become an external control for enabling and disabling the trace capture operation. When the JTAG TAP controller 204 is programmed with a DEBUG instruction, the BRTC pin causes the processor core 104 to stop executing an instruction sequence and enter debug mode. Setting of the BRKMODE pin causes the BRTC pin to control activation of the trace capture operation. The trace capture status is designated by the TRON bit of the ITCR.

Bit 6 (FRCRDY) is a bit that controls forcing the RDY signal to the processor that is active to enable the processor to move on to the next bus cycle in cases where a bus operation to an undefined memory or I/O space has occurred in the absence of a subtractive decode agent. Use of FRCRDY is to be coordinated with chipset logic.

Bit 7 (STOP) is a stop bit that supports a software technique for checking the state of the STOPTX pin. When STOP reads back high, the processor is in debug mode and all debug commands are enabled.

Bit 8 (SMMSP) is an SMM control bit that allows memory accesses initiated through the debug port 100 to take place in the SMM space. When SMMSP is reset, memory accesses initiated through the debug port 100 apply to the normal memory address space. Setting Of SMMSP causes memory accesses initiated through the debug port 100 to apply to the SMM address space.

Bit 9 (DISFLUSH) is a control bit for controlling flushing of a cache on entry to debug mode. With DISFLUSH reset the cache is flushed on entry to debug mode. Setting DISFLUSH prevents the cache from flushing on entry to debug mode.

Bit 10 (RX) is a data received bit that indicates whether data has been received from the host system 111 so that the processor core 104 can read the data from the RX_DATA register.

Bit 11 (TX) is a data transmit bit that indicates the processor core 104 is ready to transmit data so that the host system 111 can read the data from the TX_DATA register.

Communication between an operating system (OS) and Applications via the JTAG Debug port 100 is initiated by the host system 111 writing the DEBUG instruction to the JTAG instruction register in the JTAG TAP controller 204. Writing of the DEBUG instruction causes the Serial Debug Shifter 212 to connect to the JTAG TDI-TDO serial interface of the JTAG TAP controller 204. The serial debug port 100 includes two debug registers for transmitting (TX_DATA register) and receiving (RX_DATA register) data. TX_DATA and RX_DATA are accessed using the soft address and serial/parallel debug register commands.

The processor core 104 initiates a data transmission by first testing the read-only TX bit in the ITCR register. If the TX bit is set to 0 then the processor core 104 executes an X86 instruction to transfer the data to the TX_DATA register. The serial port 100 sets the TX bit in the DCSR and ITCR registers indicating to the host system 111 data is ready for transmission. The serial port 100 also sets the STOPTX pin to high. After the host system 111 completes reading the transmit data from the TX_DATA register, the TX bit is set to 0. A TXINTEN bit in the ITCR register, when set, generates a signal to interrupt the processor core 104. The interrupt is generated only when TX bit in the ITCR register makes a transition to 0. When the TXINTEN bit is not set, the processor core 104 polls the TX bit of the ITCR register to further transmit the data.

The host system 111 sends data to the processor core 104 by first testing the read-only RX bit in the DCSR register. If the RX bit is set to 0, then the host system 111 writes the data to the receive data (RX_DATA) register and the serial port 100 sets the RX bit to 1 in the DCSR and ITCR registers. The RXINTEN bit in the ITCR register, when set, generates a signal to interrupt the processor core 104. The interrupt is only generated when RX bit in the DCSR makes a transition to 1. When the RXINTEN bit is not set, the processor core 104 polls the RX bit of the ITCR register. If the RX bit is set to 1, the processor core 104 executes an X86 instruction to read the data from the receive data (RX_DATA) register. After data is read by the processor core 104 from the RX_DATA register, the RX bit is set to 0 by the serial port 100. The host system 111 continuously reads the DCSR register and monitors the RX bit to continue sending data.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A processor comprising:
    a processor core supporting running of a software system, the software system including input/output function calls; and
    a debug interface coupled to the processor core and connectable to an external software debug device, the external software debug device detecting operating signals generated by the processor core during running of the software system; wherein
    the software system transfers debug information via the debug interface using the input/output function calls while the processor core continues execution during a data transfer of the input/output function calls.

2. A processor core according to claim 1 wherein:
    an input/output function call is a printf( ) function.

3. A processor core according to claim 1 wherein:
    the debug interface includes a parallel trace port that transfers data responsive to an input/output function call.

4. A processor core according to claim 3 wherein:
    the parallel debug port is supplied as a bond-out port accessible when the processor is packaged in a bond-out package.

5. A processor core according to claim 1 wherein:
    the debug interface includes a parallel debug port that transfers data responsive to an input/output function call.

6. A processor core according to claim 5 wherein:
    the parallel debug port is supplied as a bond-out port accessible when the processor is packaged in a bond-out package.

7. A processor core according to claim 1 wherein:
    the debug interface includes a serial debug port that transfers data responsive to an input/output function call.

8. A processor core according to claim 7 wherein:
    the serial debug port is compliant with the IEEE-1149.1-1990 JTAG interface standard or other similar standard.

9. A processor core according to claim 7 wherein:
    wherein the serial port includes a plurality of pins for carrying conventional JTAG signals TMS, TCK, TDI and TDO.

10. A processor core according to claim 9 wherein:
    the serial port further includes at least one additional pin to facilitate communication between the external software debug device and the processor core.

11. A processor core according to claim 10 wherein:
    the serial port further includes a plurality of additional pins to facilitate communication between the external software debug device and the processor core, the additional pins supporting sideband signals including:
        a command acknowledge signal (CMDACK);
        a dual-purpose break execution and trace control signal (BRTC);
        an execution stopped and receive data signal (STOPTX); and
        an off-chip trigger event signal (TRIG).

12. A processor core according to claim 1 further comprising:
    a trace buffer coupled to the debug interface and coupled to the processor core, wherein the debug interface, wherein an input/output function call supports software system access to information stored in the trace buffer.

13. A processor core according to claim 1 wherein:
    the debug interface includes a serial debug port and a parallel debug port; and
    the input/output function calls perform transmission of debug information between the external software debug device and the processor core, the parallel debug port being enabled through the serial debug port.

14. A method of operating a processor including a processor core and a debug interface for connecting the processor core to an external software debug device, the method comprising:
    running a software system on the processor core, the software system including input/output function calls;
    executing a debug program on the external software debug device, the debug program for analyzing operating signals of the processor core;
    via the external software debug device, detecting operating signals generated by the processor core during running of the software system;
    transferring debug information via the debug interface using the input/output function calls while the processor core continues execution during a data transfer of the input/output function calls.

15. A method according to claim 14 wherein:
    an input/output function call is selected from among a printf( ) function, a scanf( ) function, a read service, and a write service.

16. A processor circuit comprising:
    an integrated circuit chip;
    a processor core fabricated on the integrated circuit chip, the processor core supporting running of a software system, the software system including input/output function calls; and
    a debug interface coupled to the processor core and connectable to an external software debug device, the external software debug device detecting operating signals generated by the processor core during running of the software system; wherein
    the software system transfers debug information via the debug interface using the input/output function calls while the processor core continues execution during a data transfer of the input/output function calls.

* * * * *

UNITED STATES PATENT AND TRADEMARK OFFICE
CERTIFICATE OF CORRECTION

PATENT NO. : 5,978,902
DATED : November 2, 1999
INVENTOR(S) : Daniel P. Mann

It is certified that error appears in the above-identified patent and that said Letters Patent is hereby corrected as shown below:

In column 35, claim 9, line 65, delete "wherein ";

In column 36, claim 12, line 19, delete "wherein the debug interface,".

Signed and Sealed this

Eighth Day of August, 2000

*Attest:*

*Attesting Officer*

Q. TODD DICKINSON

*Director of Patents and Trademarks*